United States Patent
Eckenrode et al.

(10) Patent No.: US 10,956,627 B1
(45) Date of Patent: *Mar. 23, 2021

(54) BUILDING PERFORMANCE ASSESSMENT SYSTEM AND METHOD

(71) Applicant: The AUROS GROUP, INC., Carnegie, PA (US)

(72) Inventors: Beth Ann Eckenrode, Presto, PA (US); Craig Enrico Stevenson, Oakdale, PA (US)

(73) Assignee: The AUROS Group, Inc., Carnegie, PA (US)

( * ) Notice: Subject to any disclaimer, the term of this patent is extended or adjusted under 35 U.S.C. 154(b) by 350 days.

This patent is subject to a terminal disclaimer.

(21) Appl. No.: 15/907,222

(22) Filed: Feb. 27, 2018

Related U.S. Application Data

(60) Provisional application No. 62/530,563, filed on Jul. 10, 2017.

(51) Int. Cl.
| | |
|---|---|
| *G06F 30/13* | (2020.01) |
| *G01M 99/00* | (2011.01) |
| *G06Q 10/06* | (2012.01) |
| *G06F 111/08* | (2020.01) |

(52) U.S. Cl.
CPC ............ *G06F 30/13* (2020.01); *G01M 99/00* (2013.01); *G06Q 10/067* (2013.01); *G06Q 10/06315* (2013.01); *G06F 2111/08* (2020.01)

(58) Field of Classification Search
CPC ............ G01M 99/00; G06Q 10/06315; G06Q 10/067; G06F 30/13
See application file for complete search history.

(56) References Cited

U.S. PATENT DOCUMENTS

| | | | |
|---|---|---|---|
| 8,103,465 B2 | 1/2012 | Brzezowski et al. | |
| 8,589,112 B2 | 11/2013 | Tsypin et al. | |
| 8,694,163 B2 | 4/2014 | Brzezowski | |
| 8,756,024 B2 | 6/2014 | Hedley et al. | |
| 9,482,442 B1 | 11/2016 | Mengle et al. | |
| 2011/0004350 A1 | 1/2011 | Cheifetz et al. | |
| 2011/0161124 A1 | 6/2011 | Lappinga et al. | |
| 2014/0142904 A1* | 5/2014 | Drees | G06Q 50/06 703/2 |
| 2015/0206070 A1 | 7/2015 | Giroti et al. | |

(Continued)

OTHER PUBLICATIONS

Ricci, J. C., & McMenamy, K. R. (2011). Enhancing Facilities Management and Structural Design through Building Information Modeling. (Year: 2011).*

*Primary Examiner* — Bijan Mapar
(74) *Attorney, Agent, or Firm* — Thomas M. Joseph, Esq

(57) ABSTRACT

A virtual data acquisition component generates a building performance model having a plurality of predicted building performance metrics. A physical data acquisition component obtains a plurality of trended building performance metrics. An integrated interface receives the building performance model from the virtual data acquisition component having the plurality of predicted building performance metrics and the plurality of physical building performance metrics from the physical data acquisition component. The integrated interface enables the comparison of the predicted building performance consumption metrics with the trended building performance metrics to identify performance gaps.

16 Claims, 19 Drawing Sheets

(56) References Cited

U.S. PATENT DOCUMENTS

| | | | |
|---|---|---|---|
| 2017/0103483 A1* | 4/2017 | Drees | G05B 13/021 |
| 2017/0115642 A1* | 4/2017 | Sridharan | G05B 13/04 |
| 2017/0206615 A1* | 7/2017 | Sloop | F24F 11/62 |
| 2019/0378020 A1* | 12/2019 | Camilus | G05B 13/048 |
| 2020/0311322 A1* | 10/2020 | Sterk | G06F 30/13 |

* cited by examiner

BUILDING PERFORMANCE ASSESSMENT SYSTEM AND METHOD

CROSS REFERENCE TO RELATED APPLICATION

This application claims the benefit under 35 U.S.C. § 119(e) of U.S. Provisional Application No. 62/530,563 entitled "BUILDING PERFORMANCE ASSESSMENT SYSTEM AND METHOD" filed Jul. 10, 2017, which is incorporated herein by reference.

BACKGROUND

The traditional measures of building performance are limited, primarily, to the measurement of energy usage through energy management systems and/or building automation systems. Energy usage can be a large expense in large commercial facilities that include many buildings. In such facilities, energy usage can cost millions of dollars per year. The challenge in managing these facilities is to minimize the costs and to maintain traditional building performance at acceptable levels.

Building designers, owners, and operators must consider other economic and environmental factors, including Indoor Air Quality (IAQ). IAQ refers to the air quality within and around buildings and structures. In particular, an analysis of IAQ can be used to assess indoor air pollution and the potential health risks that such pollution poses for building occupants. The assessment of IAQ can help building owners understand and control common indoor pollutants to reduce building occupant health concerns.

More recently, the need to assess economic and environmental factors has expanded beyond the assessment of energy usage and IAQ to include an analysis of Indoor Environmental Quality (IEQ). IEQ relates to environmental conditions inside of a building. Assessing IEQ can include evaluating air quality, lighting, views, acoustic conditions, and many other factors. Building managers and operators can increase the satisfaction of building occupants by considering all of the aspects of IEQ rather than narrowly focusing on temperature or air quality alone.

The development of sophisticated computerized energy management systems has provided buildings owners with a variety of new tools that can be used to analyze various aspects of facility operations. These systems can monitor energy usage over time, but they typically compare traditional metrics of buildings performance to historical measurements of building performance, essentially measuring the building against itself. Additionally, these metrics are essentially limited to Site Energy Utilization Intensity (EUI), Source Energy Utilization Intensity (EUI), Cost of Utilities and Greenhouse Gas Emissions (CO2).

Moreover, these traditional metrics are measured annually and only after a building is operational. This is undesirable because EUI is determined after the building has been operational for some period of time, usually considered to be twelve months. By that time, construction stakeholders have typically exited the project. Since building owners, both for profit and not for profit, cannot afford to wait for twelve months to acquire the trended data that is necessary to obtain a base level context for traditional building performance, these existing energy management systems, when used to assess building performance against design, are inadequate.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a virtual data acquisition component generates a building performance model having a plurality of predicted building performance metrics. A physical data acquisition component obtains a plurality of trended building performance metrics. An integrated interface receives the building performance model from the virtual data acquisition component having the plurality of predicted building performance metrics and the plurality of physical building performance metrics from the physical data acquisition component. The integrated interface enables the comparison of the predicted building performance consumption metrics with the trended building performance metrics to identify performance gaps.

These and other features and advantages will be apparent from a reading of the following detailed description and a review of the appended drawings. It is to be understood that the foregoing summary, the following detailed description and the appended drawings are explanatory only and are not restrictive of various features as claimed.

DETAILED DESCRIPTION

Figure 1:
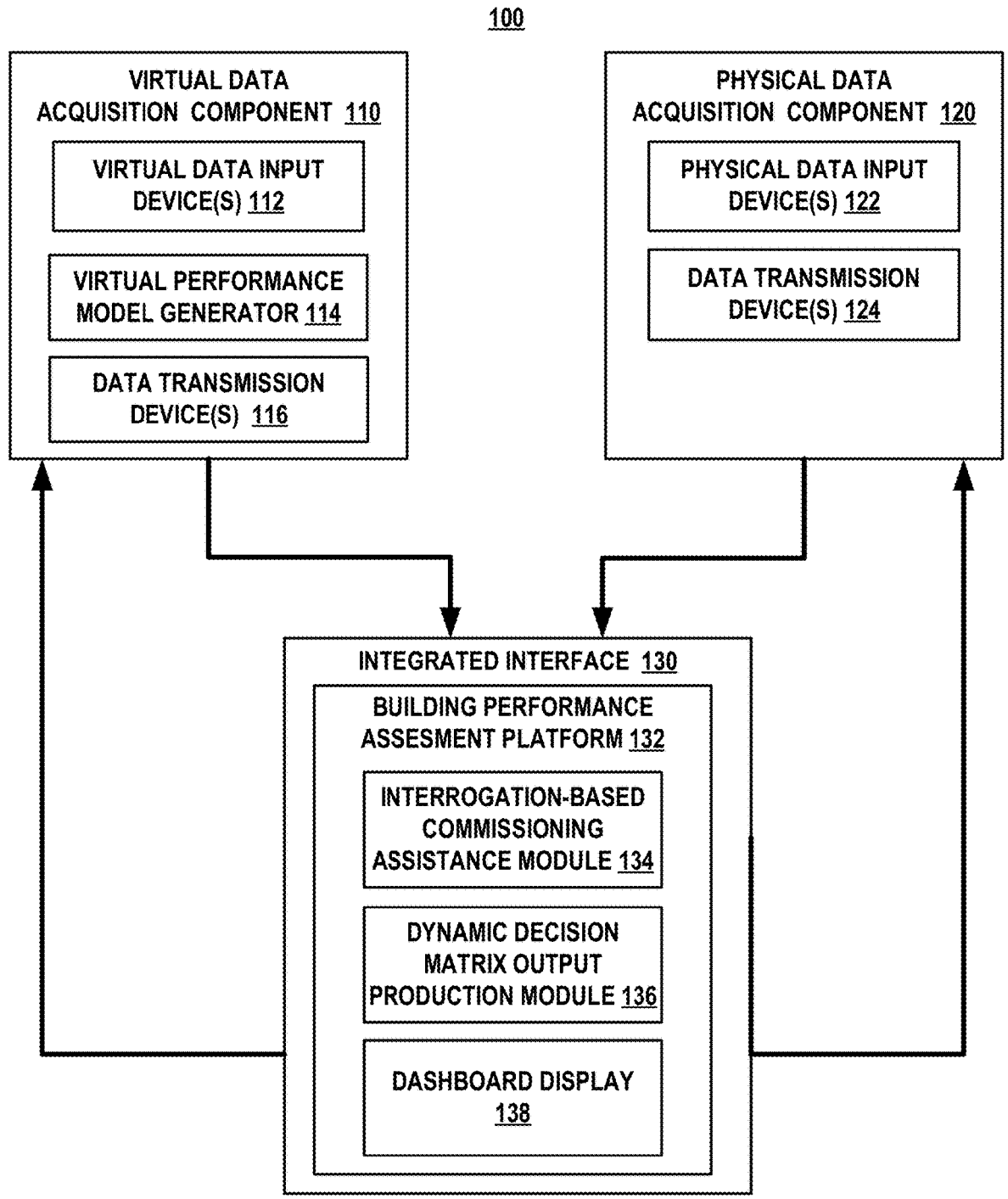
FIG. 1 illustrates a block diagram of a system for assessing building performance in accordance with the described subject matter.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more features of the described subject matter. It is to be appreciated, however, that such features can be practiced without these specific details. While certain components are shown in block diagram form to describe one or more features, it is to be understood that functionality performed by a single component can be performed by multiple components. Similarly, a single component can be configured to perform functionality described as being performed by multiple components.

Buildings consume over 50% of the US energy and have no performance standards that are typically considered during the planning or design phase of construction. Sustainability programs in the built environment are typically prescriptive processes designed to raise awareness. Only recently have sustainability programs started defining acceptable thresholds or ranges of performance for certain types of metrics. However, these sustainability programs provide limited, if any, direction on how to cost effectively achieve the performance-oriented requirements, making the adoption of these new programs difficult to scale.

Existing energy management systems do not allow building owners to assess actual building performance compared to project goals set during design due to the fragmented nature of commercial construction. Moreover, such systems are not sophisticated enough to measure a full-range of building performance factors as they relate to project goals. For these reasons there is a need for a holistic system for setting performance goals during planning and measuring performance against those goals in real-time during operations.

Referring to FIG. 1, various features of the subject disclosure are now described in more detail with respect to an integrated building performance assessment system, generally designated as 100. The system 100 addresses the above-described long felt need and allows building owners to assess building performance against project goals established during planning. The system 100 assesses building performance within a more expanded context, such that the relevant building performance metrics include metrics relating to energy usage, IAQ and IEQ. The system 100 defines high performance buildings as any building, group of buildings, sites and/or communities whose performance achieves or exceeds performance targets set during pre-planning, planning, conceptual planning, design, etc.

The system 100 relates, generally, to a system that provides a holistic approach to evidence-based performance in the built environment. The system 100 provides building owners and facility managers with the tools and the data necessary to assess, dynamically, building performance versus the targets set in planning and/or design phases of a project. Stakeholders can use the system 100 throughout the building cycle in a manner that is aligned to deliver common goals, as set in planning.

The system 100 can include a computer system that can configure and implement a virtual data acquisition component 110 that includes one or more virtual data input devices 112, a virtual performance model generator 114, and one or more data transmission devices 116. Additionally, the system 100 can configure and implement a physical data acquisition component 120 that includes one or more physical data input devices 122 and one or more data transmission devices 124. The virtual data acquisition component 110 and the physical data acquisition component 120 can connect to an integrated interface 130.

The integrated interface 130 has the ability to assess environmental impact of energy and indoor environmental quality performance for a building or a group of buildings. The integrated interface 130 measures actual performance in real-time as a function of the financial and social goals of the building owner. These goals can be determined during a planning phase or at another time thereafter.

The integrated interface 130 has the ability to display, visually, actual building performance data versus the goals set during the construction planning process. The integrated interface 130 utilizes hardware, software and proprietary knowledge to show building performance within the context of an investment thesis for a building owner. The integrated interface 130 utilizes whole building energy models and building goals that can be developed during the planning process. These models can be revisited or tracked, routinely, once a building is in operation. In this exemplary embodiment, the models can predict various indicators of building performance, including metrics for site EUI, source EUI, cost, carbon emissions and/or other greenhouse gas emissions.

The integrated interface 130 provides building owners with transparency with respect to the delivery of expected building performance during the construction process. The integrated interface 130 can link building planning to building operations. The integrated interface 130 provides building owners with the ability to set performance goals during the design and planning stages of construction and to track, digitally, actual building performance against those goals for troubleshooting purposes.

The integrated interface 130 can include a computer system or computing device that configures and implements a building performance assessment platform 132. The building performance assessment platform 132 implements and utilizes an interrogation-based commissioning assistance module 134, a dynamic decision matrix output production module 136, and a dashboard display 138.

The virtual data acquisition component 110 implements and utilizes the virtual data input devices 112 to obtain information relating to various building performance metrics. The information can be obtained from architects, designers, construction managers, modelers, engineers, and sustainability consultants. The information can relate to architectural design, cost estimates, simulated occupancy, subcomponent energy models, weather station output, whole-building energy models and/or other inputs. The information can be obtained manually or through automated data acquisition methods or systems.

The virtual performance model generator 114 can utilize the above-described information to generate a virtual building performance model having a plurality of predicted building performance metrics. The virtual building performance model can include predicted biometrics, predicted IAQ/IEQ, and/or predicted utility consumption. The predicted utility consumption can be categorized by sources, including cogeneration systems, district energy chilled-water, district energy steam, electric, gas, potable water, renewable geothermal, renewable photovoltaics, renewable wind, and/or one or more other types of utility. The virtual building performance model can be a design model or an operational model depending upon when it is generated or modified.

The virtual data acquisition component 110 can transmit the virtual performance model to the integrated interface 130 using the data transmission devices 116. The virtual performance model can be transmitted via an application programming interface (API), a cloud computing system, email, geofencing, a hardwired network, a proprietary device driver, a WiFi network, a wireless network, a Bluetooth network, and/or through any other suitable transmission method, device, or network. In some embodiments, the data transmission devices 116 can connect to the integrated interface 130 directly, so that data that is collected from the data input devices 112 is transmitted to the integrated interface 130 directly.

The physical data acquisition component 120 can configure and implement the physical data input devices 122 to collect physical data. The physical data can relate to sensor output and/or data output relating to ambient lighting, biometrics, carbon dioxide ($CO_2$), carbon monoxide (CO), circadian lighting, formaldehyde, humidity, internally generated noise, lead (Pb), ozone ($O_3$), particulate matter (PM2.5 & PM10), radon (Rn), sound pressure level, temperature, volatile organic compounds (VOCs), water quality and/or other data types relating to energy usage or indoor environmental quality. The physical data input devices 122 can obtain data manually or through automated data acquisition methods or systems.

The physical data input devices 122 can include automatic temperature controls, building automation system, design and engineering, IAQ/IEQ sensors, manual entry devices, personal data monitors, utility meters, weather stations and/or other inputs, as available.

The physical data acquisition component 120 can communicate the information from the physical data input devices 122 to the data transmission devices 124. The data transmission devices 124 can use the information to generate or to calculate a plurality of trended building performance metrics. The trended building performance metrics can include trended biometrics, trended IAQ/IEQ, and trended utility. The physical building performance metrics can be transmitted to the building performance assessment platform 132 on the integrated interface 130.

The physical data acquisition component 120 can transmit the physical building performance metrics and/or the raw data to the building performance assessment platform 132 on the integrated interface 130 using the data transmission devices 124. The information can be transmitted via an application programming interface (API), a cloud computing system, email, geofencing, a hardwired network, a proprietary device driver, a WiFi network, a wireless network, a Bluetooth network, and/or through any other suitable transmission method, device, or network. In some embodiments, the data transmission devices 124 can connect to the integrated interface 130 directly, so that data that is collected from the data input devices 122 is transmitted to the building performance assessment platform 132 on the integrated interface 130 directly.

The virtual data acquisition component 110 can generate models during various construction phases, including planning phases, design phases, calibration phases, and operation phases. The physical data acquisition component 120 can obtain the physical building performance metrics during a calibration phase. The integrated interface 130 can obtain the physical building performance metrics from the physical data acquisition component 120 during the calibration phase to transform the model from a design model into an operational model using trended data to inform the design model. In some embodiments, the planning phases and the design phases can last one year, the calibration phases can last one year, and the operational phase can last one year.

The integrated interface 130 can receive the predicted building performance metrics and the trended building performance metrics in essentially the same format to form an integrated data stream. The integrated interface 130 can enable the modification of the virtual building performance model to produce an enhanced building performance model. A builder can use the integrated data stream to modify its building plans or the building, itself. The integrated data stream can be a data stream in which the data is in the same format (e.g., unit of measure and timescale) and displayed in a manner that allows comparison.

The integrated interface 130 can configure and implement a building performance assessment platform 132. The building performance assessment platform 132 can utilize an interrogation-based commissioning assistance module 134, a dynamic decision matrix output production module 136, and a dashboard display 138.

The interrogation-based commissioning assistance module 134 can utilize the integrated data stream to modify the whole-building performance model based upon comparisons of trended data with predicted data. The interrogation-based commissioning assistance module 134 can use the trended data and/or the predicted data to perform simulations that can be used to identify and to remediate problems, which can improve whole building performance. The simulations can use new building profiles and set new targets to produce operation-based solutions.

The dynamic decision matrix output production module 136 can utilize the integrated data stream to provide output for a dynamic decision matrix. The dynamic decision matrix can include information relating to building performance goals, construction costs and long term operating costs. The output can be used by a building owner to compare multiple solution sets for improving building performance.

The dynamic decision matrix can be the product of financial modeling and/or a financial calculator. The financial calculator can be an energy use intensity (EUI) and IEQ value financial calculator. The calculator can provide the ability prove tangible financial savings that can be achieved through investment into energy conservation and improved IEQ measures. The financial models produced by the calculator can predict the potential cost or benefit of EUI and IEQ performance in whole building environments.

The calculator uses connectivity to calculate the value provided to building owners of new, existing and retrofit commercial and residential buildings. The calculator can identify the value associated with operational benefit, the social cost of carbon benefits, asset valuation benefits, and/or occupant benefits.

The calculator can be a tool for predicting and validating the savings associated with EUI and IEQ improvements as a function of investment costs. The calculators can provide a holistic view of return on investment for energy conservation and IEQ related investments.

The building performance assessment platform 132 can utilize the dashboard display 138 to provide output for visually assessing a plurality of key performance indicators for a building. The dashboard display 138 can provide output to enable visual identification of the relationship between trended and predicted building performance, which can enable the comparison of predicted building performance metrics with trended building performance metrics to identify gaps between predicted building performance and actual building performance. The dashboard display 138 can be used to identify these gaps at any time during the entire building lifespan, including the planning phases, the initial construction phases, the operation phases, and, if applicable, the building renovation phases, for new buildings, existing buildings, and/or retrofit buildings.

Figure 2:
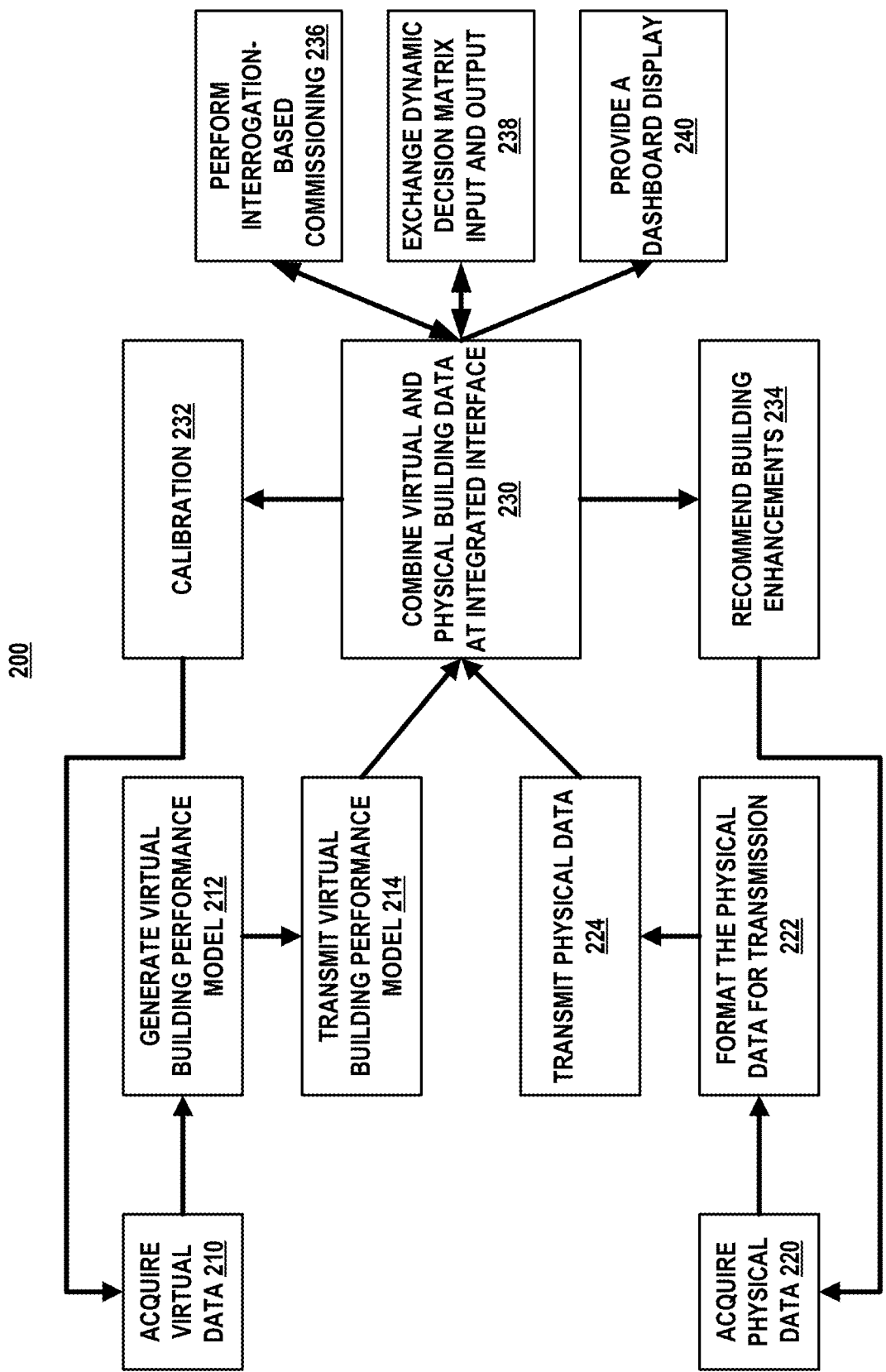
FIG. 2 illustrates a flow diagram for assessing building performance in accordance with the described subject matter.
Figure 3A:
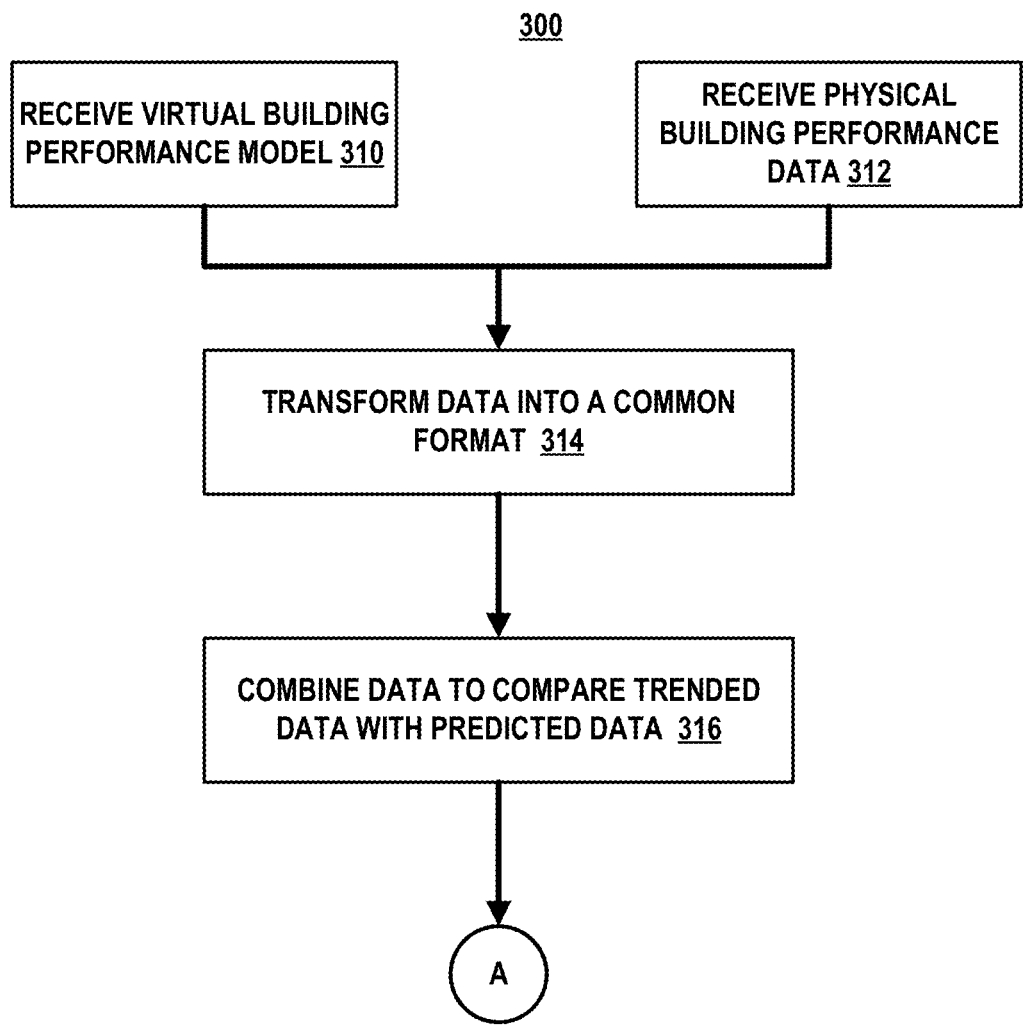
FIGS. 3A-3G illustrate a flow diagram for operating the integrated interface shown in FIG. 1 in accordance with the described subject matter.
Figure 3B:
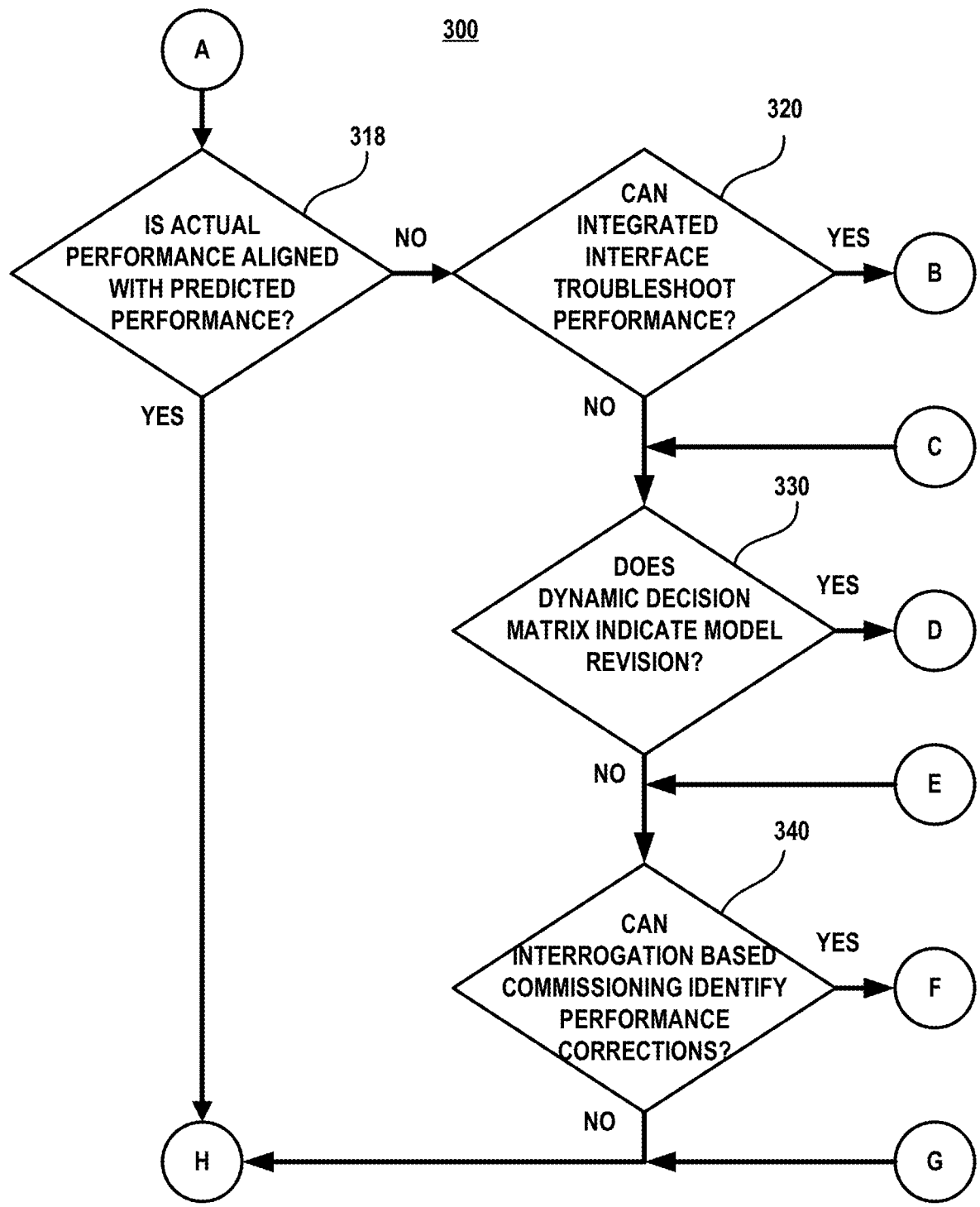
Figure 3C:
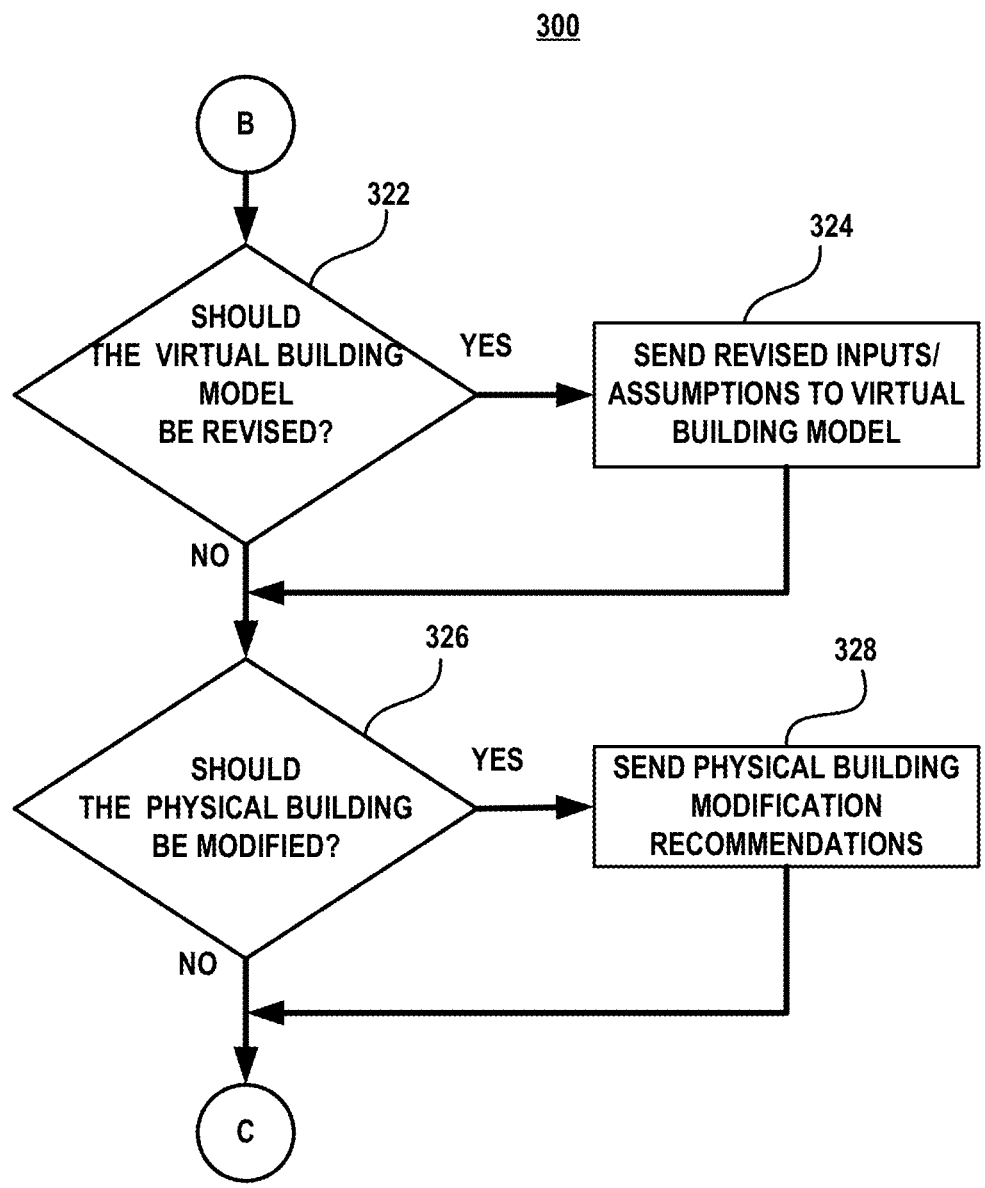
Figure 3D:
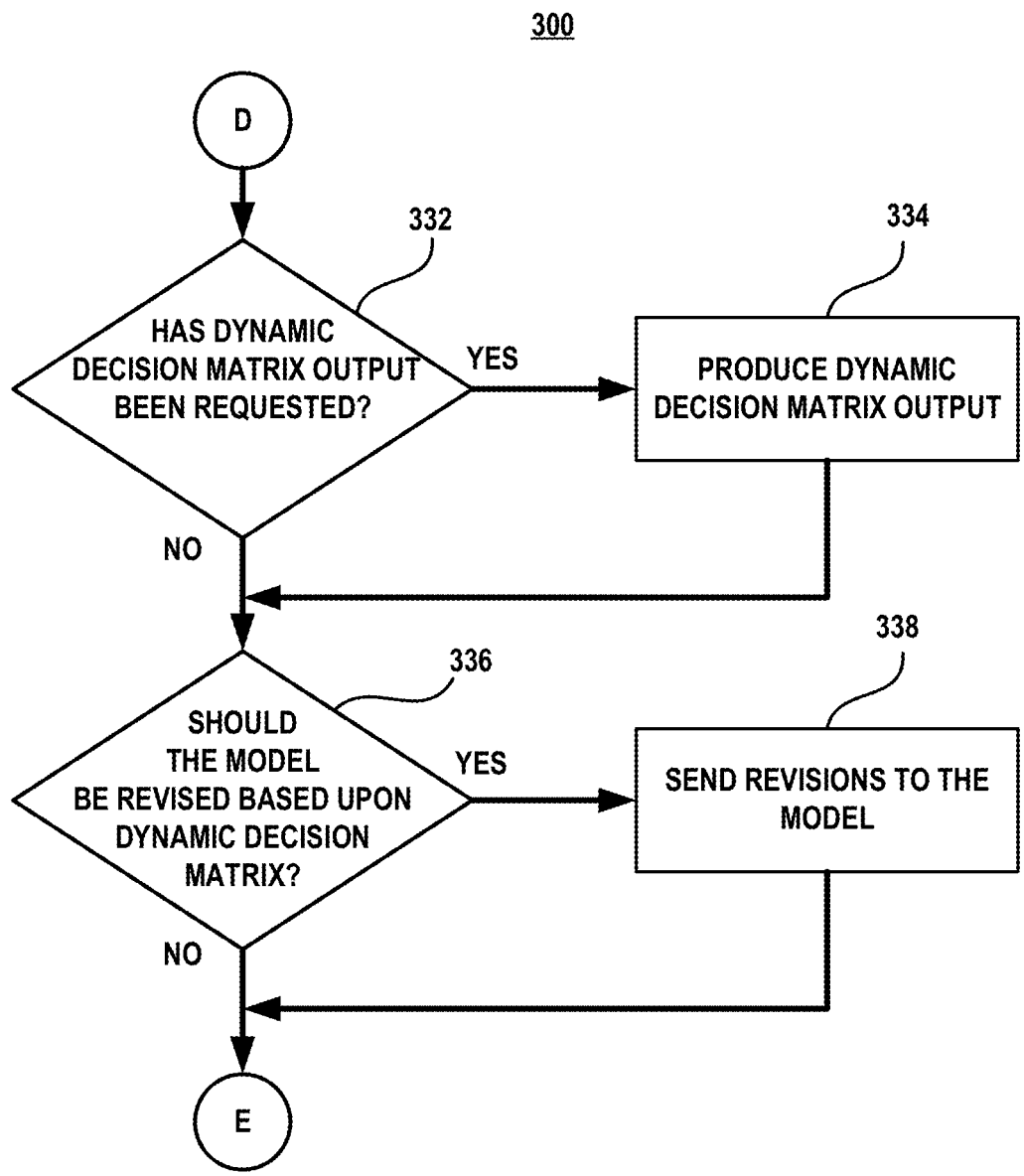
Figure 3E:
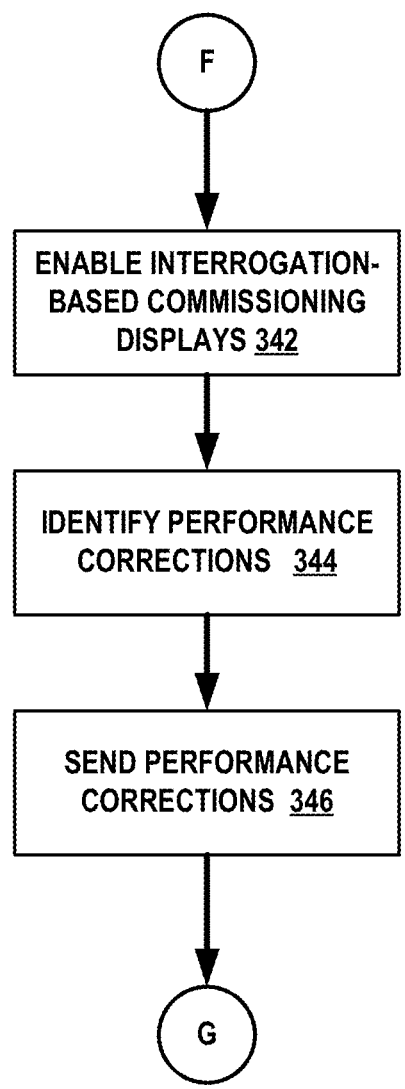
Figure 3F:
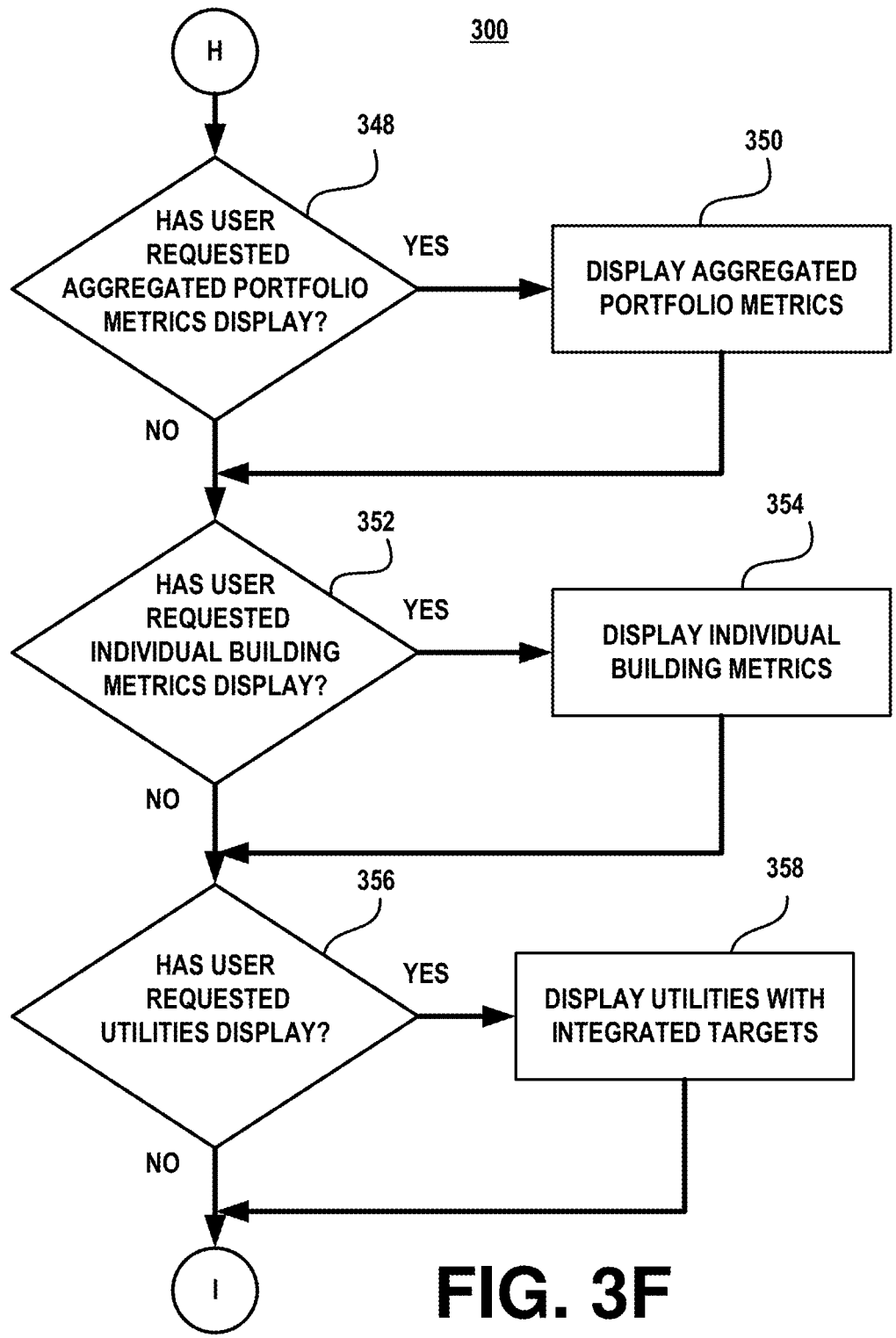
Figure 3G:
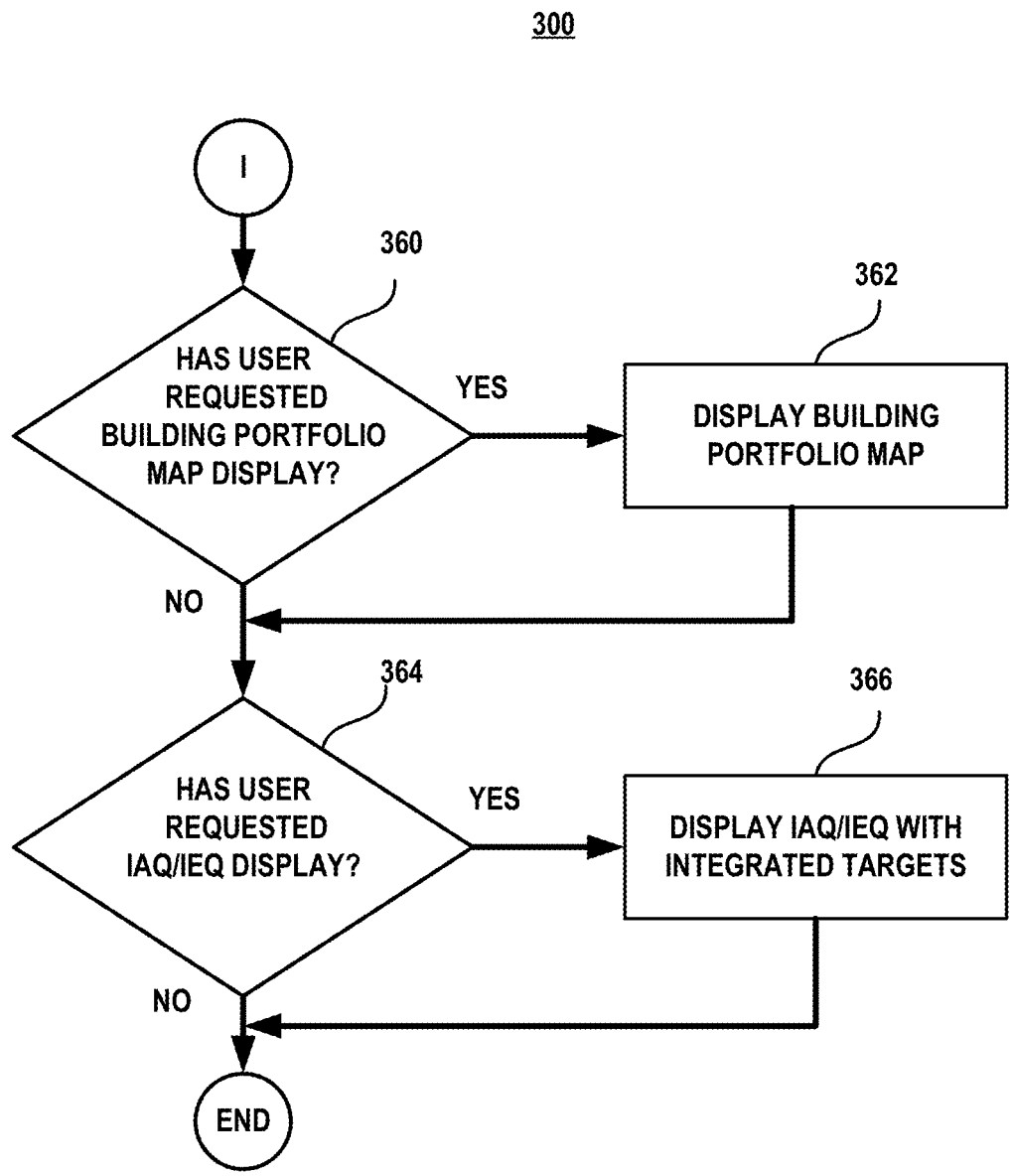

Referring to FIG. 2 with continuing reference to the foregoing figures, an exemplary process, generally designated by the numeral 200, for operating an integrated building performance assessment system is shown. In this exemplary embodiment, the process 200 can be performed by the integrated building performance assessment system 100 shown in FIG. 1.

At 210, virtual data is acquired. In this exemplary embodiment, virtual data is acquired using the virtual data acquisition component 110 shown in FIG. 1. The virtual data acquisition component 110 uses the virtual data input devices 112 to acquire the virtual data. The virtual data is communicated to the virtual performance model generator 114, which generates a virtual building performance model at 212. The virtual building performance model is transmitted to the integrated interface 130 shown in FIG. 1 at 214.

At 220, physical data is acquired. In this exemplary embodiment, physical data is acquired using the physical data acquisition component 120 shown in FIG. 1. The physical data acquisition component 120 uses the physical data input devices 122 to acquire the physical data. The physical data is communicated to the data transmission device 124 for formatting at 222. The physical building performance data is transmitted to the integrated interface 130 shown in FIG. 1 at 224.

At 230, the integrated interface combines the data from the virtual building performance model with the physical building performance data into an integrated data stream. In this exemplary embodiment, the integrated interface can be the integrated interface 130 shown in FIG. 1. The integrated interface 130 can use the data to calibrate the virtual building performance at 232 and use the data to recommend physical building enhancements (i.e., to drive building performance) at 234. The calibration at step 232 transforms the virtual building performance model from a design model into an operational model.

The integrated data stream can be divided into two categories of data. The first data category can include utility data types. Utility data types include cogeneration system data, district energy chilled-water data, district energy steam data, electric utility data, gas utility data, water utility data, various renewable energy data and/or any other type of relevant utility data. The second data category can include physical data relating to IAQ/IEQ, which includes ambient lighting, biometrics, $CO_2$, CO, circadian lighting, formaldehyde, humidity, internally generated noise, Pb, $O_3$, PM2.5, PM10, Rn, sound pressure level, temperature, VOCs, water quality and/or other relevant, related data, as described above.

At 236, interrogation-based commissioning can be performed. In this exemplary embodiment, interrogation-based commissioning can be performed by the interrogation-based commissioning assistance module 134 shown in FIG. 1.

At 238, dynamic decision matrix output and input can be exchanged. In this exemplary embodiment, dynamic decision matrix output and input can be exchanged by the dynamic decision matrix output production module 136 shown in FIG. 1. The dynamic decision matrix output can include data relating to building performance goals, building performance costs, and long term operating costs.

At 240, a dashboard display can be provided. In this exemplary embodiment, the integrated interface 130 can implement the dashboard display 138 shown in FIG. 1. The dashboard display 138 can display, dynamically, aggregate portfolio metrics, individual building metrics, utility metrics, IAQ/IEQ metrics, and/or building portfolio maps and/or metrics.

Referring to FIGS. 3A-3G with continuing reference to the foregoing figures, an exemplary process, generally designated by the numeral 300, for operating an integrated interface is shown. In this exemplary embodiment, the process 300 can be performed by the integrated interface 130 shown in FIG. 1.

At 310, the integrated interface 130 receives a virtual building performance model. In this exemplary embodiment, the integrated interface 130 receives the virtual building performance model from the virtual data acquisition component 110 shown in FIG. 1. The virtual building performance model having a plurality of predicted metrics, including energy consumption, IAQ and/or IEQ metrics.

At 312, the integrated interface 130 receives physical building performance metrics and/or data. In this exemplary embodiment, the integrated interface 130 receives the metrics and/or data from the physical data acquisition component 120 shown in FIG. 1. The metrics and/or data can include a plurality of trended or measured metrics, including energy consumption, IAQ and/or IEQ metrics.

At 314, the integrated interface 130 can transform the data into a common format to form an integrated data stream. At 316, the data can be combined to compare trended data with predicted data.

At 318, the integrated interface 130 can be utilized to determine whether actual performance aligns with predicted performance. If the integrated interface 130 determines that actual performance is not aligned with predicted performance, then the integrated interface 130 can be utilized to determine whether the actual and/or the predicted performance can be improved through troubleshooting at 320.

At 322, the integrated interface 130 determines whether the virtual building performance model should be revised. If the integrated interface 130 determines that the model should be revised, then the integrated interface 130 communicates with the virtual data acquisition component 110 to revise the model at 324. The virtual data acquisition component 110 can revise the model by recalibrating the virtual data input devices 112 or by adjusting the virtual performance model generator 114 shown in FIG. 1.

At 326, the integrated interface 130 determines whether the physical building should be modified. If the integrated interface 130 determines that the physical building should be modified, then the integrated interface 130 sends building modification recommendations at 328. The building modification recommendations can be displayed by the display device 138 shown in FIG. 1.

At 330, the integrated interface 130 configures and implements the dynamic decision matrix output production module 136 shown in FIG. 1 to determine whether the model should be revised because of performance gaps. In this exemplary embodiment, the integrated interface 130 determines whether dynamic decision matrix output has been requested at 332. If the output has been requested, the integrated interface 130 produces dynamic decision matrix output.

The dynamic decision matrix can be used to determine the impact of an enhanced building performance model on various building performance goals and/or costs, which can be based upon actual building performance. The goals and/or costs can include sustainability goals, first costs, and long term operating costs.

The dynamic decision matrix output can be used to determine whether the model should be revised at 336. If the integrated interface 130 determines that the model should be revised, the integrated interface 130 can communicate with the virtual data acquisition component 110 to revise the model at 338. It should be understood that the dynamic decision matrix output can be used to determine whether the building should be reconfigured, retrofitted, and/or renovated.

At 340, the integrated interface 130 configures and implements the interrogation based-commissioning assistance module 134 shown in FIG. 1 to determine whether the models should be revised because gaps exist. In this exemplary embodiment, the integrated interface 130 enables interrogation-based commissioning displays at 342. The displays can produce output relating to area personnel use, building automation systems, design and engineering modifications, electrical systems, envelop performance, field changes, indoor environmental quality, mechanical systems, outside climate, quality control testing, thermal comfort, value-engineering and/or any other relevant type of output.

The interrogation-based commissioning assistance module 134 can interact with building owners and/or other users to identify corrections at 344. The performance corrections can be sent through the integrated interface 130 to the virtual data acquisition component 110, to the physical data acquisition component 120, or to the dashboard display 138 at 346.

The integrated interface 130 can configure and implement the dashboard display 138 shown in FIG. 1. The operation of the dashboard display 138 is represented by steps 348-366 in FIGS. 3F-3G.

At 348, the integrated interface 130 determines whether a user has requested an aggregated portfolio metrics display. If the output has been requested, the dashboard display 138 generates an aggregated portfolio metrics display at 350. The aggregated portfolio metrics can include EnergyStar® portfolio manager output, site EUI, source EUI, carbon, and/or costs. EnergyStar® is a registered trademark of the Environmental Protection Agency.

At 352, the integrated interface 130 determines whether a user has requested an individual building metrics display. If the output has been requested, the dashboard display 138 generates an individual building metrics display at 354. The individual building metrics can include EnergyStar® portfolio manager output, site EUI, source EUI, carbon, and/or costs.

At 356, the integrated interface 130 determines whether a user has requested a display of utility information with integrated targets thereon. If the output has been requested, the dashboard display 138 generates the display at 358. The utility information can include metrics relating to cogeneration systems, district energy chilled-water, district energy steam, electric, gas, potable water, renewable geothermal, renewable photovoltaics, renewable wind, or any other type of utility.

At 360, the integrated interface 130 determines whether a user has requested a building portfolio map. If the output has been requested, the dashboard display 138 generates a building portfolio map at 362. The building portfolio map can include one or more building high performance indicators.

At 364, the integrated interface 130 determines whether a user has requested an IAQ/IEQ display with integrated targets. If the output has been requested, the dashboard display 138 generates an IAQ/IEQ display with integrated targets at 366. The display can include metrics and/or targets relating to ambient lighting, biometrics, CO2, CO, circadian lighting, formaldehyde, humidity, internally generated noise. Pb, O3, PM2.5, PM10, Rn, sound pressure level, temperature, VOCs, water quality and/or other relevant, related data, as described above.

Figure 4A:
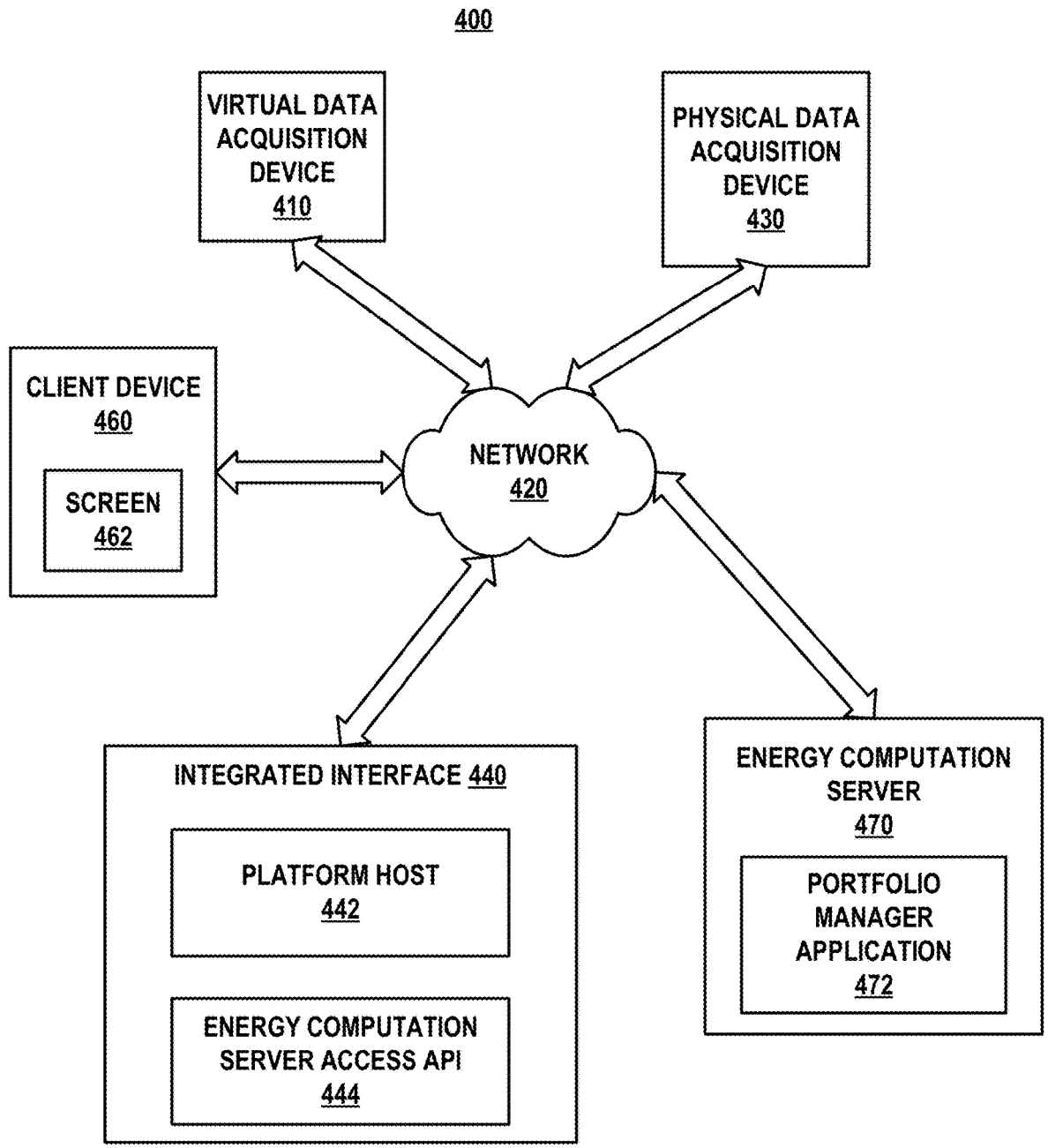
FIG. 4A illustrates a schematic diagram for another embodiment of a building performance assessment system in accordance with the described subject matter.
Figure 4B:
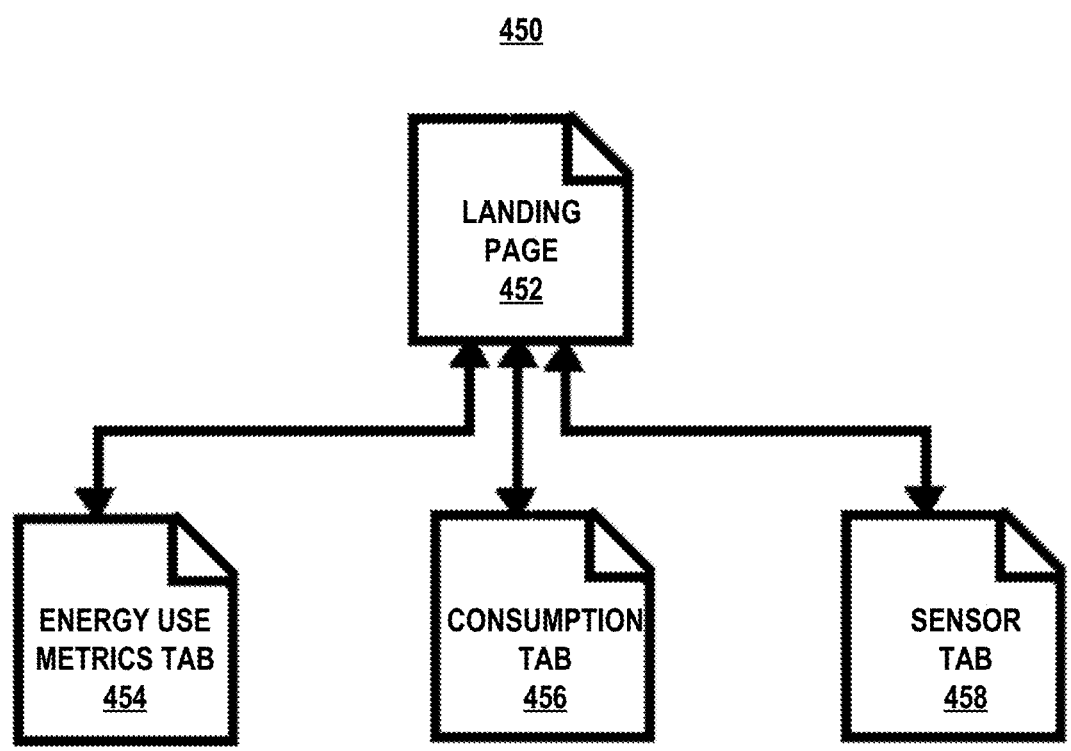
FIG. 4B illustrates a schematic diagram for a building performance assessment dashboard in accordance with the described subject matter.

Referring now to FIGS. 4A-4B with continuing reference to the foregoing figures, another embodiment of a building performance assessment system, generally designated as 400, is illustrated. It is to be appreciated that sections, components, and/or portions of the building performance assessment system 400 can be implemented as a computer, computer system, and/or computing device and can be configured as a special purpose computer or a general purpose computer specifically programmed to generate building performance models. Further, it is to be appreciated these features can be implemented by various types of operating environments, computer networks, platforms, frameworks, computer architectures, and/or computing devices.

Implementations of a computer system are described within the context of a system configured to perform various steps, methods, and/or functionality in accordance with the described subject matter. It is to be appreciated that a computer system can be implemented by one or more computing devices. Implementations of the computer system can be described in the context of "computer-executable instructions" that are executed to perform various steps, methods, and/or functionality in accordance with the described subject matter.

In general, computers, computer systems, and/or computing devices can include one or more processors and storage devices (e.g., memory and disk drives) as well as various input devices, output devices, communication interfaces, and/or other types of devices. Such systems and devices can include a combination of hardware and software. It can be appreciated that various types of computer-readable storage media can be part of a computer, computer system, and/or computing device. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computer system can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

A computer, computer system, and/or computing device can implement and utilize one or more program modules. Generally, program modules include routines, programs, objects, components, data structures, etc., that perform particular tasks or implement particular abstract data types.

A computer, computer system, and/or computing device can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

A computer system can include one or more servers. Servers can be implemented by one or more computing devices such as server computers configured to provide various types of services and/or data stores in accordance with aspects of the described subject matter. Exemplary severs computers can include, without limitation: web servers, front end servers, application servers, database servers, domain controllers, domain name servers, directory servers, and/or other suitable computers.

Components of computers, computer systems, and/or computing devices can be implemented by software, hardware, firmware or a combination thereof. For example, computer systems can include components implemented by computer-executable instructions that are stored on one or more computer-readable storage media and that are executed to perform various steps, methods, and/or functionality in accordance with aspects of the described subject matter.

As shown in FIGS. 4A-4B, the system 400 includes a virtual data acquisition device 410 that has the ability to acquire virtual data or metrics relating to predicted building performance based upon input from one or more devices and/or sources. The virtual data acquisition device 410 can generate a virtual building performance model based the virtual data or metrics. The virtual building model can include predicted energy consumption metrics, predicted indicators, predicted measurements, and/or predicted sensor outputs. The models can be whole building energy models that establish building goals during the planning process.

The virtual data acquisition device 410 connects to a network 420, which is connected to a physical data acquisition device 430 that can have a plurality of sensors and/or sensor measurement systems that can be used to acquire trended data and trended sensor measurements.

The network 420 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Servers and workstations can communicate via networks using various communication protocols (e.g., Internet communication protocols, WAN communication protocols, LAN communications protocols, P2P protocols, telephony protocols, and/or other network communication protocols), various authentication protocols, and/or various data types (web-based data types, audio data types, video data types, image data types, messaging data types, signaling data types, and/or other data types).

The physical data acquisition device 430 has the ability to acquire observed or trended data or metrics relating to actual building performance based upon input from one or more devices and/or sources. The observed or trended data can include observed or trended building performance metrics, trended indicators, trended measurements, and/or trended sensor outputs. The trended metrics, indicators, measurements and/or sensor outputs can be acquired in real-time or near real-time.

The physical data acquisition device 430 can convert raw sensor output into actual building performance metrics to report the metrics over the network 420. Alternatively, the physical data acquisition device 430 can report actual raw sensor output over the network 420 for conversion into actual building performance metrics by an integrated interface 440.

The integrated interface 440 connects to the virtual data acquisition device 410 and the physical data acquisition device 430 over the network 420. The integrated interface 440 includes a platform host 442 and an API 444. The integrated interface 440 can be configured to implement the platform host 442 to receive the virtual building performance model from the virtual data acquisition device 410 and/or the physical building performance metrics or raw data from the physical data acquisition device 430. The integrated interface 440 can communicate with the virtual data acquisition device 410 and/or the physical data acquisition device 430 to revise and/or to track the model, the data and/or the metrics, as necessary.

The platform host 442 can generate a platform that enables a dashboard 450 for the comparison of predicted building performance metrics and/or indicators from the virtual building performance model with trended building performance metrics and/or indicators. The dashboard 450 can be an integrated building performance dashboard that includes a graphical display that provides for the comparison of actual building performance to simulated targets set during building design and/or planning. Building performance can be based upon various metrics relating to all sources of energy, IAQ and/or IEQ.

The dashboard 450 can provide users with the ability to compare actual building performance for a building with respect to energy usage, indoor air quality metrics, indoor environmental quality metrics, indicators, measurements, and/or sensor output against performance goals for the building set at the time of investment. As a result, the dashboard 450 provides building owners with the ability to assess return on investment and/or to hold vendors accountable for successful delivery of products or services.

The dashboard 450 can include a landing page 452 and various tabs, such as an energy use metrics tab 454, a consumption tab 456, and a sensor tab 458. The landing page 452 can include at least one building icon relating to a building and links to the energy use metrics tab 454, the consumption tab 456, and the sensor tab 458. The dashboard 450 can facilitate real-time analysis of utility consumption and/or investment targets at a particular point of investment, planning, discovery and/or design.

The integrated interface 440 connects to one or more client device(s) 460 over the network 420. The client device(s) 460 can include one or more building monitor displays, desktop PCs, laptops, tablets, iPads, iPhones, smartphones or other similar communication devices. The client devices 450 can be enabled to display the landing page 452, the energy use metrics tab 454, the consumption tab 456, and the sensor tab 458. The client device(s) 460 can include a screen 462.

The consumption tab 456 can display the at least one trended building performance metric with a corresponding predicted building performance metric, so that the trended building performance metric can be compared to the predicted building performance metric for a time interval within a predetermined period of time.

The sensor tab 458 can display, graphically, sensor output, utility meter output, or other similar output from the physical data acquisition device 430. The sensor tab 158 can display sensor output in a manner that conveys utility consumption. The output can be used to determine various actual energy usage, environmental quality, and/or other building performance metrics for the energy use metrics tab 454, the consumption tab 456, and/or the sensor tab 458. The output can be superimposed with target metrics at equivalent time intervals.

IEQ information can be displayed by the dashboard 450 by physical area, sensor type and uses graphical icons to identify individual sensors. The visual display of actual building performance versus simulated targets at time of investment shows provides real-time analysis of building performance.

A building owner can use the information obtained from the dashboard 450 and displayed on the landing page 452, the energy use metrics tab 454, the consumption tab 456 and/or the sensor tab 458 to use whole building modeling and the dashboard to troubleshoot, digitally, building performance attributes during the building interrogation process post occupancy. The dashboard 450 can be used to perform interrogation-based commissioning processes that use digital simulation to narrow and to clarify the areas of performance gaps.

The API 444 connects the integrated interface 440 to an energy computation server 470 that hosts an energy portfolio manager application 472. In this exemplary embodiment, the energy computation server 470 is a server that is hosted by EnergyStar®). The energy portfolio manager application 472 can generate energy use metrics output for display on the energy use metrics tab 454.

Figure 5:
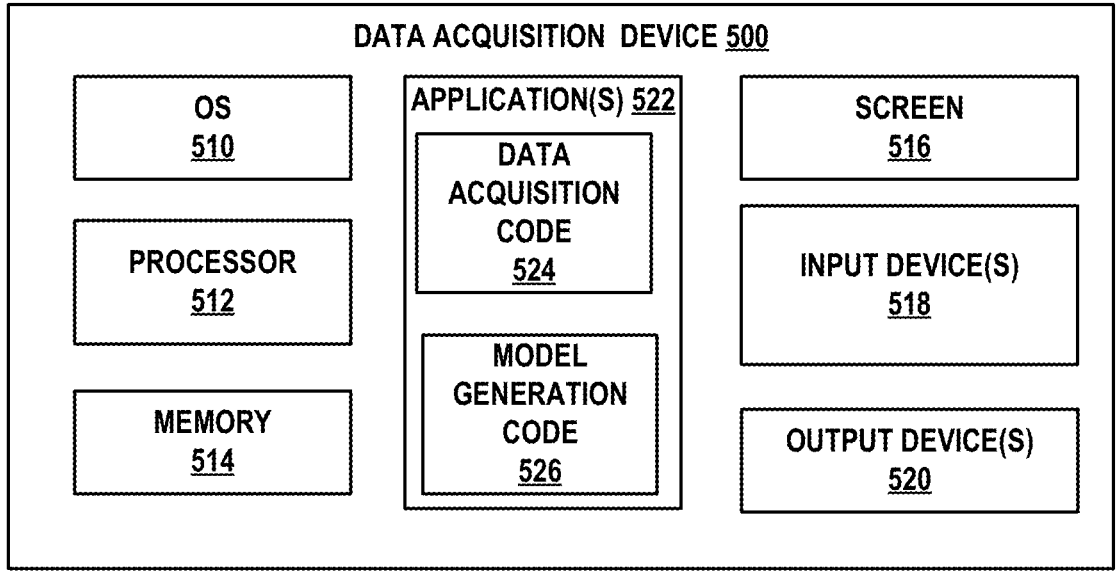
FIG. 5 illustrates a schematic diagram for a data acquisition device in accordance with the described subject matter.

Referring now to FIG. 5 with continuing reference to the foregoing figures, a data acquisition device, generally designated as 500, is illustrated. The data acquisition device 500 can be implemented as a computer, computer system, and/or computing device that can be configured as a special purpose computer or a general purpose computer specifically programmed to acquire data. The data acquisition device 500 can be configured to implement the virtual data acquisition component 110 shown in FIG. 1 and/or the virtual data acquisition device 410 shown in FIGS. 4A-4B.

The data acquisition device 500 includes an operating system 510, a processor 512, memory 514, a screen 516, an input device 518, and an output device 520. The building model generation device 500 can host one or more applications 522 that include data acquisition code 524 and/or model generation code 526.

The processor 512 can perform tasks such as signal coding, data processing, input/output processing, power control, and/or other functions. Memory 514 can be used for storing data and/or code for running operating system 510 and/or application(s) 522. Example data can include web pages, text, images, sound files, video data, or other data to be sent to and/or received from one or more network servers or other devices via one or more wired and/or wireless networks.

The operating system 510, the processor 512, memory 514, and/or application(s) 522 can cooperate to utilize screen 516 and/or to communicate with input device 518 and/or output device 520.

The application(s) 522 can produce virtual building performance models that predict building performance during the planning phase. The virtual building performance models can be whole-building energy models that can be used to create alternate scenarios for building performance. The models can include utility consumption, IAQ and/or IEQ targets that can be provided to the dashboard 450 shown in FIGS. 4A-4B. The targets can be labels that are displayed simultaneously with actual building performance. The targets can be displayed for predetermined scenarios.

The application(s) 522 can create bundles of efficiency measures with calculated financial costs/benefits for owner to compare each option to the EUI target and baselines established during the earlier simulations. The models can include financial metrics that can be used to assess the impact of efficiency measures on operational costs, return on investment/asset, social cost of carbon and occupant benefits (i.e. indoor environmental quality, etc.). The financial metrics can be used to calculate four levels of value provided to building owners of new, existing and retrofit commercial and residential buildings, including operational benefit, social cost of carbon benefits, asset valuation benefits, and/or occupant benefits.

In some embodiments, the application(s) 522 can transform raw data in to building performance metrics. In other embodiments, the application(s) 522 transmit the raw data to an integrated interface, such as integrated interface 130 shown in FIG. 1 or integrated interface 440 shown in FIG. 4A, to calculate such metrics.

Figure 6:
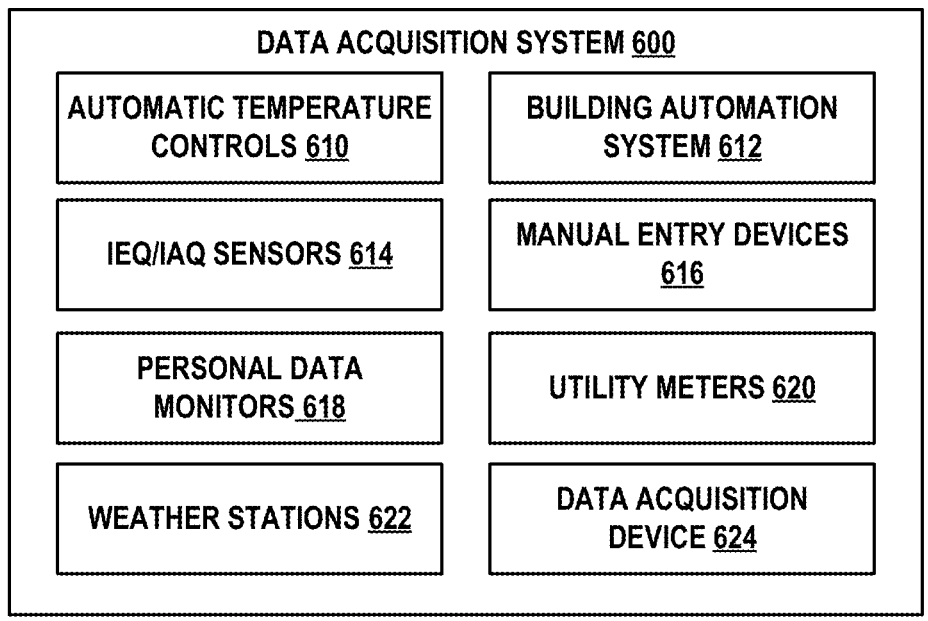
FIG. 6 illustrates a schematic diagram for a data acquisition system in accordance with the described subject matter.

Referring now to FIG. 6 with continuing reference to the foregoing figures, a data acquisition system, generally designated as 600, is shown. The data acquisition system 600 can be configured and implemented as the virtual data acquisition component 110 and/or the physical data acquisition component 120 shown in FIGS. 1A-1B. Similarly, the data acquisition system 600 can be configured and implemented as the virtual data acquisition device 410 and/or to the physical data acquisition device 430 shown in FIGS. 4A-4B.

The data acquisition system 600 can include various components and/or sensor assemblies that can acquire physical data from a building. These components and/or sensor assemblies can include automatic temperature controls 610, a building automation system 612, IEQ/IAQ sensors 614, manual entry devices 616, personal data monitors 618, utility meters 620, and weather stations 622. These components and/or sensor assemblies can communicate with a data acquisition device 624. In this exemplary embodiment, the data acquisition device 624 can be the data acquisition device 500 shown in FIG. 5.

In some embodiments, the automatic temperature controls 610, building automation system 612, IEQ/IAQ sensors 614, manual entry devices 616, personal data monitors 618, utility meters 620, and weather stations 622 can connect to data loggers, such as meters and/or JAVA application control engines (JACES), to facilitate communication over the network 420 shown in FIGS. 4A-4B. In this exemplary embodiment, the JACES can include a JACE 8000—Tridium controller operating with Niagara 4 within the Niagara Framework®. Niagara Framework® is a registered trademark of Tridium, Inc., of Richmond, Va.

Figure 7:
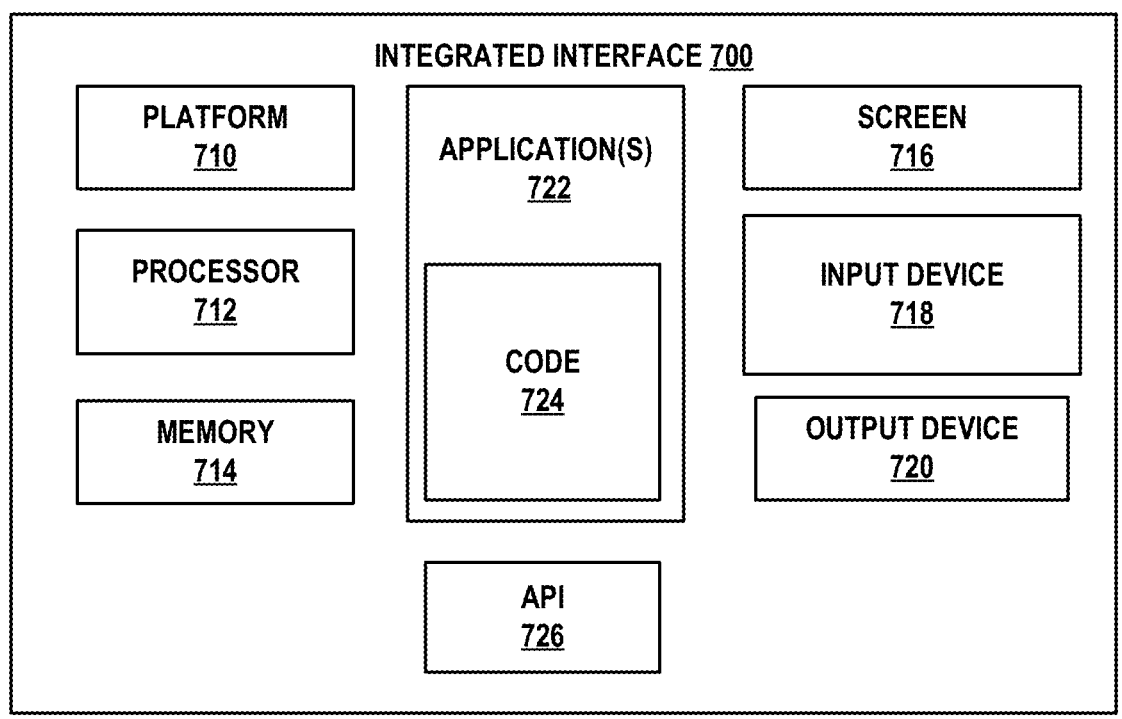
FIG. 7 illustrates a schematic diagram for an integrated interface in accordance with the described subject matter.

Referring now to FIG. 7 with continuing reference to the foregoing figures, an integrated interface, generally designated by numeral 700, is shown. The integrated interface 700 can be implemented as a computer, a computer system and/or a computing device. The integrated interface 700 can be the integrated interface 130 shown in FIG. 1. In such embodiments, the integrated interface 700 connects, directly, to one or more data acquisition devices 500 shown in FIG. 5 and/or data acquisition systems 600 shown in FIG. 6.

Alternatively, the integrated interface 700 can be the integrated interface 440 shown in FIGS. 4A-4B. In such embodiments, the integrated interface 700 connects to one or more data acquisition devices 500 shown in FIG. 5 and/or data acquisition systems 600 shown in FIG. 6 over a network, such as network 420 shown in FIG. 4A.

The integrated interface 700 can include a platform 710, a processor 712, memory 714, a screen 716, an input device 718, and an output device 720. The integrated interface 700 can host one or more application(s) 722 that include code 724 for enabling the dashboard 450 shown in FIG. 4B.

The integrated interface 700 can include an API 726 that can connect to the energy computation server 470 shown in FIGS. 4A-4B over the network 420. The API 726 is essentially identical to the API 744 shown in FIGS. 4A-4B.

The processor 712 can performing tasks such as signal coding, data processing, input/output processing, power control, and/or other functions. Memory 714 can be used for storing data and/or code for running platform 710 and/or application(s) 722. Example data can include web pages, text, images, sound files, video data, or other data to be sent to and/or received from one or more network servers or other devices via one or more wired and/or wireless networks.

The platform 710, the processor 712, memory 714, and/or the application(s) 722 can cooperate to utilize screen 716 and/or to communicate with input device 718 and/or output device 720.

The platform 710 can utilize the application 722 obtain a virtual building performance model from the virtual data acquisition component 110 shown in FIG. 1 and/or the virtual data acquisition device 410 shown in FIGS. 4A-4B. The platform 710 can utilize the application 722 obtain physical building performance data from the physical data acquisition component 120 shown in FIG. 1 and/or the physical data acquisition device 430 shown in FIGS. 4A-4B. The platform 710 can enable the application 722 to enable comparison of predicted building performance metrics with trended building performance metrics.

The platform 710 can configure and implement the dashboard 450, shown in FIGS. 4A-4B, which can include the landing page 452, the energy use metrics tab 454, the consumption tab 456, and the sensor tab 458. The dashboard 450 can generate visual displays that are based on the predicted building performance metrics and/or the actual building performance metrics to populate the landing page 452, the energy use metrics tab 454, the consumption tab 456, and the sensor tab 458.

The integrated interface 700 can communicate API 726, which can communicate with the portfolio manager application 472 shown in FIGS. 4A-4B to obtain an energy use metric therefrom. The application 722 can utilize the energy use metric to populate the energy use metrics tab 454 shown in FIGS. 4A-4B.

Exemplary Dashboard Output

FIGS. 8A-8D illustrate exemplary output for the dashboard 450 shown in FIGS. 4A-4B. It is to be appreciated that the output can be displayed on the client device screen 462 shown in FIGS. 4A-4B, the screen 518 shown in FIG. 5, the integrated interface screen 718 shown in FIG. 7 and/or another other similar screen or display device suitable for showing computer generated output.

Figure 8A:
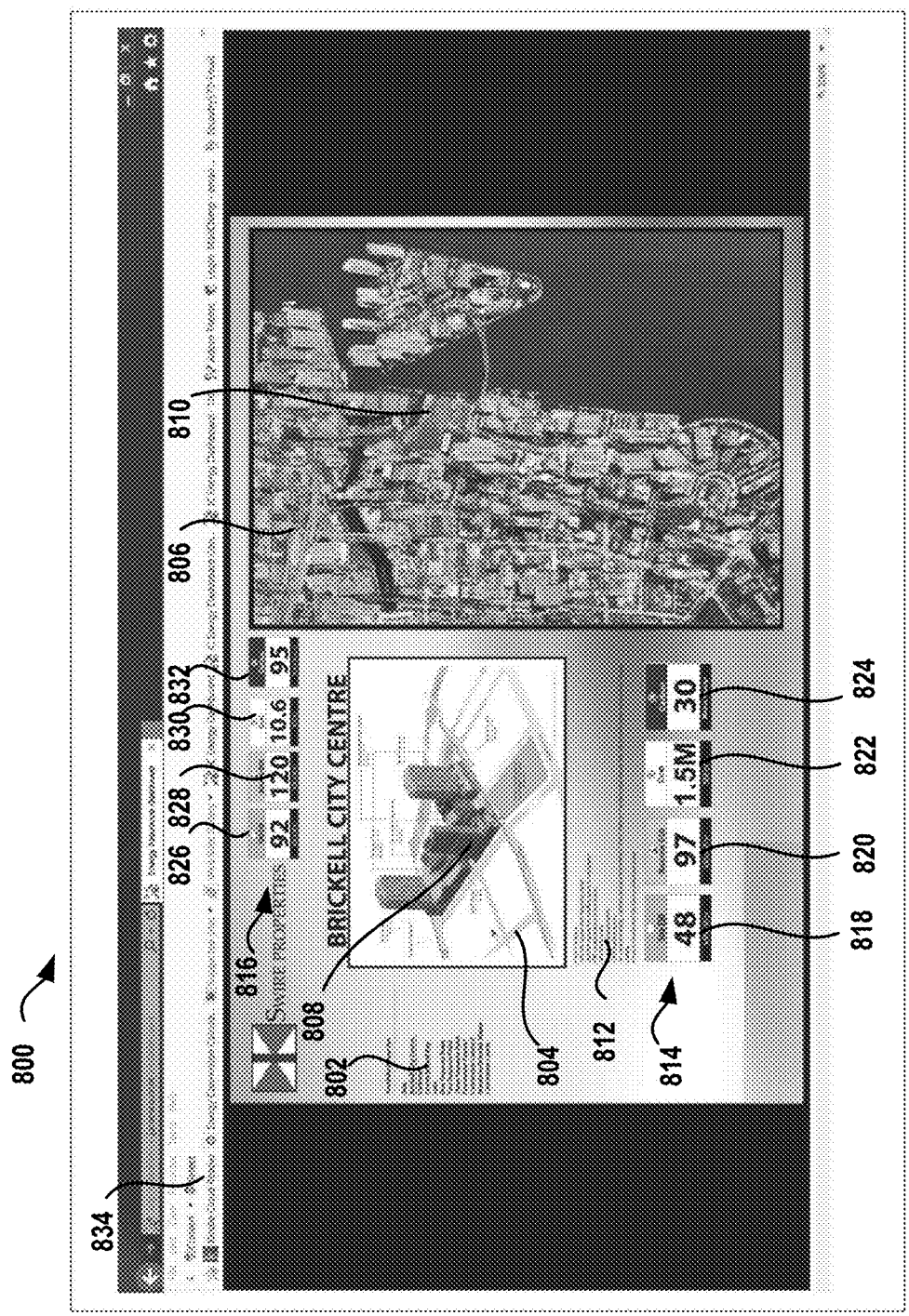
FIG. 8A illustrates a screen shot of a landing page for a dashboard in accordance with the described subject matter.

Referring to FIG. 8A with continuing reference to the foregoing figures, a landing page 800 is shown. The landing page 800 provides a building owner with key building performance indicators for various portfolios of connected building. The landing page 800 is essentially identical to the landing page 452 shown in FIGS. 4A-4B.

The landing page 800 includes a drop-down list 802 of building portfolios and/or buildings and a pair of maps 804-806 that can display building icons 808-810 that can represent buildings within a particular building portfolio. The landing page 800 can also display various indicia 812 of building statistics for a particular building, building portfolio, or building project.

The landing page 800 provides building owners with the ability to click onto the building icons 808-810 to obtain various key performance metrics, indicators, sensor outputs, and/or measurements for the buildings that are associated therewith. In this exemplary embodiment, the landing page 800 includes a list 814 of key indicators/metrics for the building associated with building icon 808 and a list 816 of key indicators/metrics for the building associated with building icon 810. The list 814 includes indicators for site EUI 818, source EUI 820, cost 822, and carbon (i.e., greenhouse gasses) 824 for building icon 808. The list 816 includes metrics for site EUI 826, source EUI 828, cost 830, and carbon emissions (i.e., greenhouse gas emissions) 832 for building icon 810.

The landing page 800 includes links 834 to other tabs that are similar to the energy use metrics tab 454, the consumption tab 456, and/or the sensor tab 458 shown in FIGS. 4A-4B.

Figure 8B:
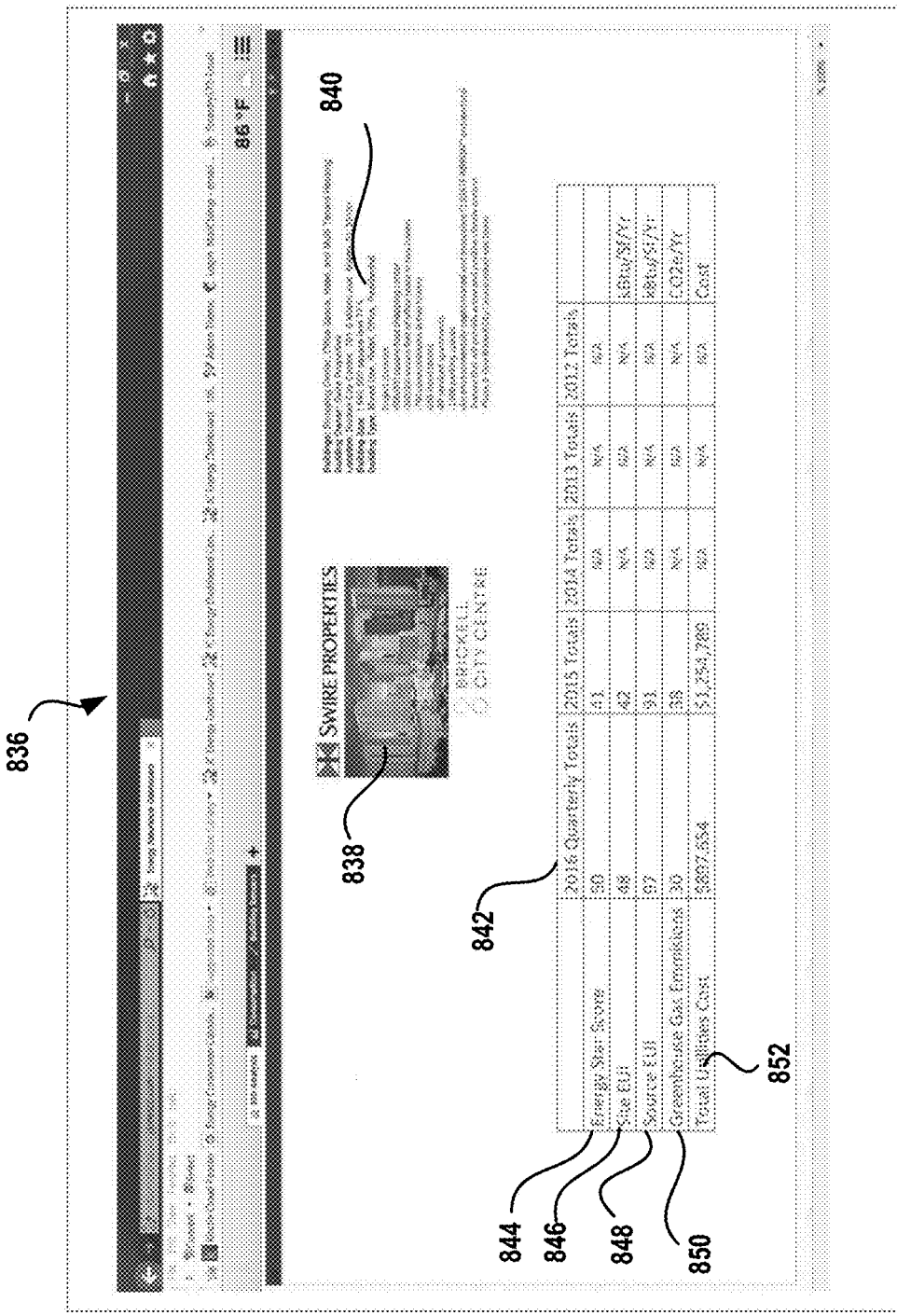
FIG. 8B illustrates a screen shot of a building metrics page for a dashboard in accordance with the described subject matter.

Referring to FIG. 8B with continuing reference to the foregoing figures, an energy use metrics tab 836 is shown. The energy use metrics tab 836 provides building owners with the ability to perform an energy use intensity analysis. The energy use metrics tab 836 can display property details and energy use metrics for the current year and for past years. The energy use metrics tab 836 is essentially identical to the energy use metrics tab 454 shown in FIGS. 4A-4B.

The energy use metrics tab 836 can display a property icon 838 that can represent a building and/or a portfolio of buildings, a description 840 of the property, and a table 842 that displays various energy use metrics measured at various time embodiments. In this exemplary embodiment, the energy use metrics include EnergyStar® scores 844, site EUI 846, source EUI 848, greenhouse gas emissions 850, and total utilities costs 852.

The energy use metrics tab 836 can obtain certain energy use metrics from the energy computation server 470 shown in FIGS. 4A-4B. The energy computation server 470 enables the energy portfolio manager application 472 to provide automatic EnergyStar® metrics via an EnergyStar® driver.

Figure 8C:
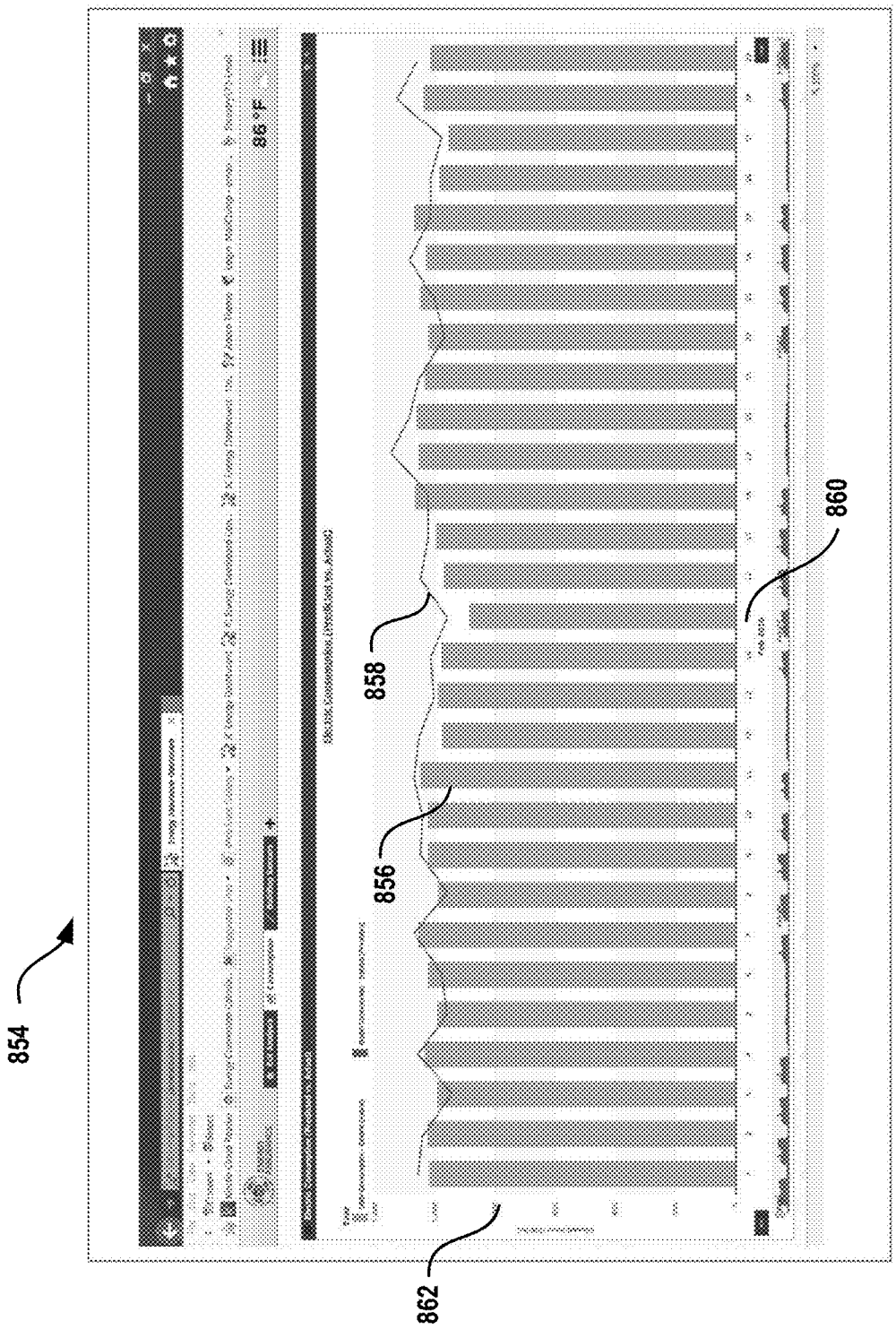
FIG. 8C illustrates a screen shot of a consumption tab for a dashboard in accordance with the described subject matter.

Referring to FIG. 8C with continuing reference to the foregoing figures, a consumption tab 854 is shown. The consumption tab 854 can be a utilities consumption tab that provides real-time consumption data from attached metering for a particular building. The consumption tab 854 is essentially identical to the consumption tab 456 shown in FIGS. 4A-4B.

The consumption tab 854 has the ability to display trended consumption indicia 856 and virtual consumption indicia 858. The consumption tab 854 displays the data in a bar graph format with an x-axis 860 directed to time and a y-axis 862 directed to energy consumption. In this exemplary embodiment, the time is measured in increments of days and energy consumption is measured in kilowatt hours.

The consumption tab 854 can support all connection types and protocols. The consumption tab 854 can display trending information that can be combined with model trend data to give building owners the ability to control building usage. This information can be used to identify issues ranging from inefficient systems to buildings that are being operated outside of designed/commissioned parameters. The consumption tab 854 can support all sources of utilities and renewables, such as cogeneration systems, district energy chilled-water, district energy steam, electric, gas, potable water, renewable geothermal, renewable photovoltaics, renewable wind, and/or any other source.

Figure 8D:
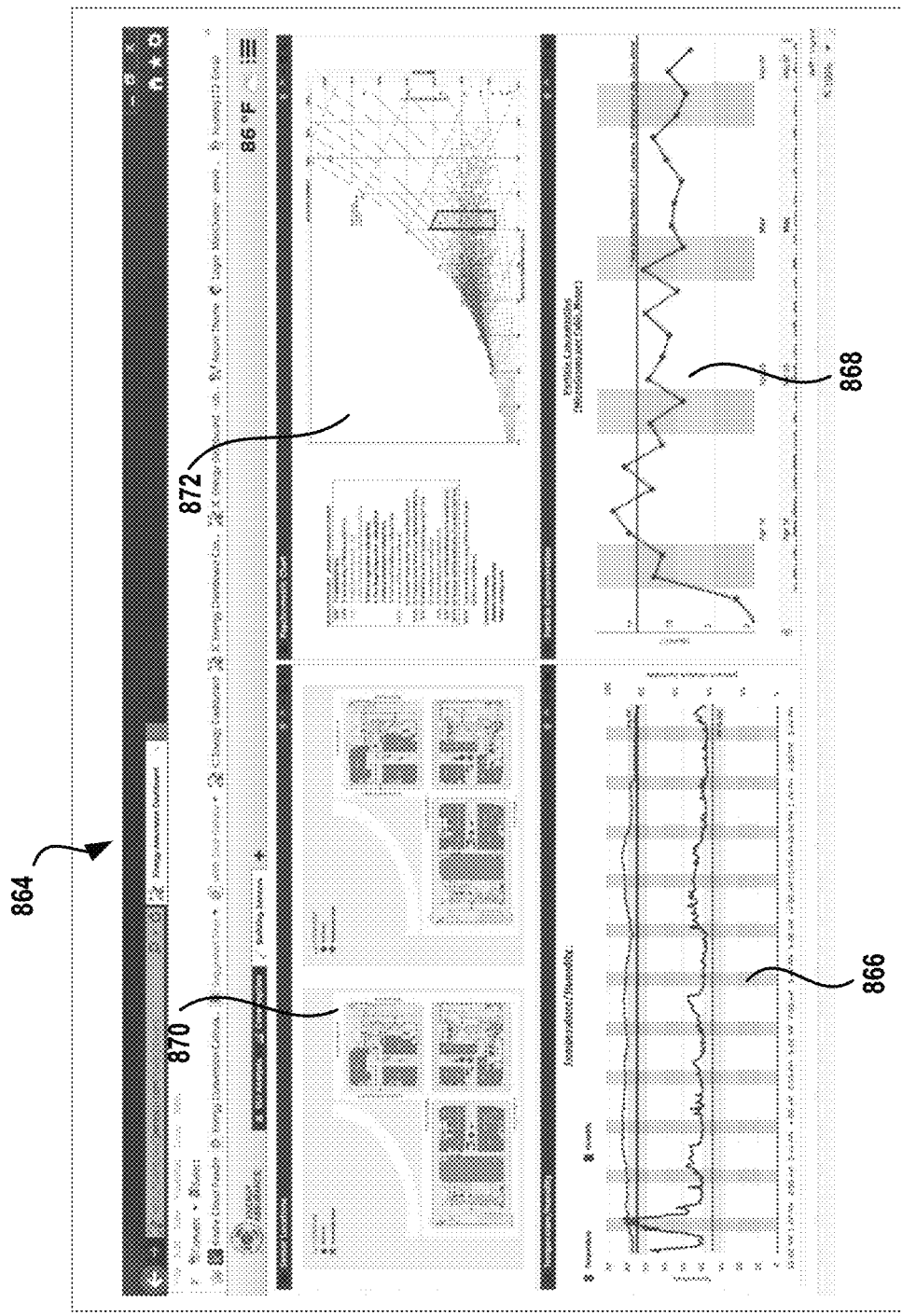
FIG. 8D illustrates a screen shot of a building sensors tab for a dashboard in accordance with the described subject matter.

Referring to FIG. 8D with continuing reference to the foregoing figures, a sensor tab 864 is shown. The sensor tab 864 can display trended output from the physical data acquisition component 120 shown in FIG. 1 and/or the physical data acquisition device 430 shown in FIGS. 4A-4B. The sensor tab 864 is essentially identical to the sensor tab 458 shown in FIGS. 4A-4B.

The sensor tab 864 can include a pair of graphs 866-868 that can illustrate real-time temperature, humidity and indoor environmental quality data output. The sensor tab 864 can also include a graphical representation of a floor plan 870.

The sensor tab 864 can support multiple connection types and protocols to provide trending information relating to sensor output. This trending information can be combined with model trending data to give building owners the ability to control building environmental conditions and air quality, such as ambient lighting, biometrics, $CO_2$, CO, circadian lighting, formaldehyde, humidity, internally generated noise, Pb, $O_3$, $PM2.5$, $PM10$, Rn, sound pressure level, temperature, VOCs, water quality and/or other environmental factors.

The trending information can be used to produce other charts that illustrate comfort zones or areas for other sensor output. For example, the sensor tab 864 can display a dynamic psychrometric chart 872 that can be used to illustrate thermal comfort by identifying areas or zones in which temperature and humidity are at comfortable levels. Specifically, in this exemplary embodiment, the psychrometric chart 872 ties together temperature and humidity levels over time to determine whether the intersections of these three variables fall within certain temperature-humidity comfort zones. The psychrometric chart 872 can be displayed on a thermal comfort meter.

In other embodiments, the sensor tab 864 can display charts that include other combinations of sensor output to identify other comfort zones. The charts can be used to assess visual comfort, auditory comfort, respiratory comfort or other similar types of comfort. The sensor tab 864 can function as a thermal comfort meter.

Exemplary Processes

Figure 9A:
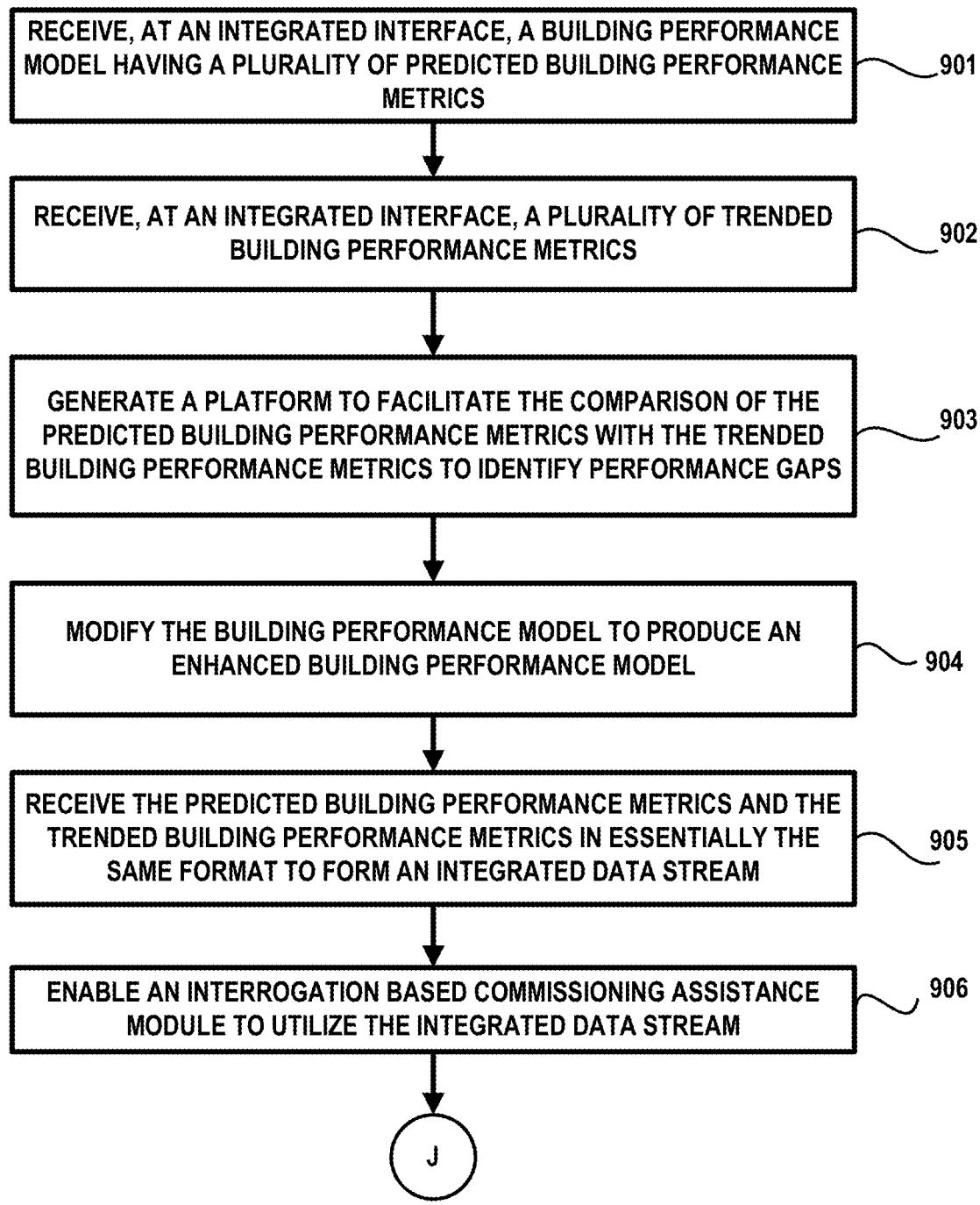
FIGS. 9A-9B illustrate an embodiment of an exemplary process in accordance with the described subject matter.
Figure 9B:
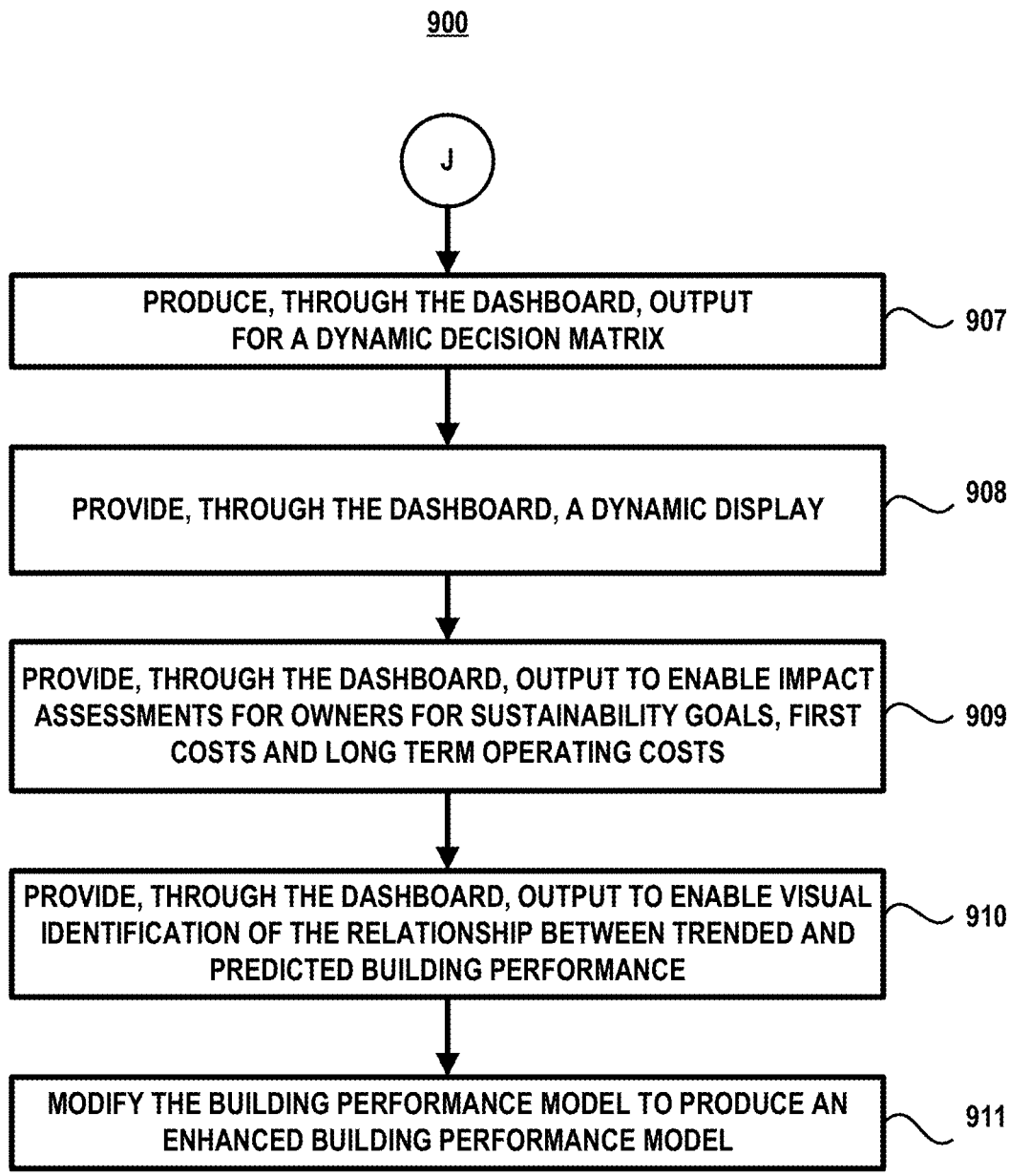

Referring to FIGS. 9A-9B with continuing reference to the foregoing figures, a method 900 is illustrated as an embodiment of an exemplary process for assessing building performance in accordance with features of the described subject matter. Method 900, or portions thereof, can be performed by one or more computing devices, a computer system, computer-executable instructions, software, hardware, firmware or a combination thereof in various embodiments. For example, method 900 can be performed by system 100 shown in FIG. 1, system 400 shown in FIGS. 4A-4B, or any other suitable system.

At 901, an integrated interface receives a building performance model having a plurality of predicted building performance metrics. In this exemplary embodiment, the integrated interface can be integrated interface 130 shown in FIG. 1, integrated interface 440 shown in FIGS. 4A-4B, and/or integrated interface 700 shown in FIG. 7. The building performance model can be received from virtual data acquisition component 110 shown in FIG. 1, virtual data acquisition device 410 shown in FIGS. 4A-4B and/or data acquisition device 500 shown in FIG. 5.

At 902, the integrated interface receives a plurality of trended building performance metrics. In this exemplary embodiment, the trended building performance metrics can be received from physical data acquisition component 120 shown in FIG. 1, physical data acquisition device 430 shown in FIGS. 4A-4B and/or data acquisition system 600 shown in FIG. 6.

At 903, a platform is generated to facilitate the comparison of the predicted building performance metrics with the trended building performance metrics to identify performance gaps. In this exemplary embodiment, the platform can be the building performance assessment platform 132 shown in FIG. 1.

At 904, the building performance model is modified to produce an enhanced building performance model. In this exemplary embodiment, the building performance model can be modified by virtual data acquisition component 110 shown in FIG. 1, virtual data acquisition device 410 shown in FIGS. 4A-4B and/or data acquisition device 500 shown in FIG. 5.

At 905, the predicted building performance metrics and the trended building performance metrics are received in essentially the same format to form an integrated data stream. In this exemplary embodiment, the integrated interface 130 can configure and implement the building performance assessment platform 132 to form the integrated data stream.

At 906, an interrogation based commissioning assistance module is enabled to utilize the integrated data stream. In this exemplary embodiment, the interrogation based commissioning assistance module can be the interrogation-based commissioning assistance module 134 shown in FIG. 1.

At 907, the integrated interface produces output for a dynamic decision matrix through the dashboard. In this exemplary embodiment, the integrated interface 130 configures and implements the dynamic decision matrix output production module 136 shown in FIG. 1.

At 908, the integrated interface provides a dynamic display through the dashboard. In this exemplary embodiment, the dynamic display can be produced through the dashboard display 138 shown in FIG. 1.

At 909, the integrated interface provides output to enable impact assessments for owners for sustainability goals, first costs and long term operating costs through the dashboard. In this exemplary embodiment the dashboard display 138 shown in FIG. 1 can be used to display the output.

At 910, the integrated interface provides output to enable visual identification of the relationship between trended and predicted building performance. In this exemplary embodiment the dashboard display 138 shown in FIG. 1 can be used to display the output.

At 911, the building performance model is modified to produce an enhanced building performance model. In this exemplary embodiment, the integrated interface 130 shown in FIG. 1, the integrated interface 440 shown in FIGS. 4A-4B, and/or the integrated interface 700 shown in FIG. 7 can communicate with the virtual data acquisition component 110 shown in FIG. 1, the virtual data acquisition device 410 shown in FIGS. 4A-4B and/or the data acquisition device 500 shown in FIG. 5 to produce the enhanced building performance model.

SUPPORTED EMBODIMENTS

The detailed description provided above in connection with the appended drawings explicitly describes and supports various features of a building performance assessment system in accordance with the described subject matter. By way of illustration and not limitation, supported embodiments include a computing system for assessing building performance, the system comprising: a processor configured to execute computer-executable instructions; and memory storing computer-executable instructions configured to: receive, at an integrated interface, a building performance model having a plurality of predicted building performance metrics, receive, at an integrated interface, a plurality of trended building performance metrics, and generate a platform to facilitate the comparison of the predicted building performance metrics with the trended building performance metrics to identify performance gaps.

Supported embodiments include the foregoing computing system, wherein the integrated interface modifies the building performance model to produce an enhanced building performance model.

Supported embodiments include any of the foregoing computing systems, wherein the integrated interface receives the predicted building performance metrics and the trended building performance metrics in essentially the same format to form an integrated data stream.

Supported embodiments include any of the foregoing computing systems, wherein the integrated interface enables an interrogation based commissioning assistance module to utilize the integrated data stream.

Supported embodiments include any of the foregoing computing systems, wherein the integrated interface utilizes the interrogation based commissioning module to modify the enhanced building performance model.

Supported embodiments include any of the foregoing computing systems, wherein the integrated interface utilizes the integrated data stream to provide output for a dynamic decision matrix.

Supported embodiments include any of the foregoing computing systems, wherein the dynamic decision matrix includes building performance goals, building construction costs, and long-term operational costs for a building.

Supported embodiments include any of the foregoing computing systems, wherein the integrated interface provides a dynamic dashboard display.

Supported embodiments include any of the foregoing computing systems, wherein the integrated interface provides output for visually assessing a plurality of key performance indicators for a building.

Supported embodiments include any of the foregoing computing systems, wherein the integrated interface provides output to enable impact assessments for owners for sustainability goals, first costs and long term operating costs.

Supported embodiments include any of the foregoing computing systems, wherein the integrated interface provides output to enable visual identification of the relationship between trended and predicted building performance.

Supported embodiments include any of the foregoing computing systems, wherein the building performance model is a design model.

Supported embodiments include any of the foregoing computing systems, wherein the integrated interface receives trended data to calibrate the design model and to convert the design model into an operational model.

Supported embodiments include any of the foregoing computing systems, wherein the systems define building performance success based upon a predetermined set of performance based goals.

Supported embodiments include any of the foregoing computing systems, wherein the systems define building performance failure based upon a predetermined set of performance based goals.

Supported embodiments include any of the foregoing computing systems, wherein a dashboard has ability to aggregate data tracked to identify gaps or areas of concern.

Supported embodiments include any of the foregoing computing systems, wherein a dashboard has ability to disaggregate data tracked to identify gaps or areas of concern.

Supported embodiments include any of the foregoing computing systems, wherein the integrated interface enables a comfort display for assessing building occupant comfort.

Supported embodiments include any of the foregoing computing systems, wherein the integrated interface synthesizes data for display on the comfort display to assess at least one of thermal comfort, visual comfort, auditory comfort, and respiratory comfort.

Supported embodiments include any of the foregoing computing systems, wherein the integrated interface synthesizes at least one of temperature data and humidity data for display on the comfort display to assess comfort.

Supported embodiments include a computer-implemented method, an apparatus, a computer-readable storage medium, and/or means for implementing and/or performing any of the foregoing systems or portions thereof.

Supported embodiments include a computing-implemented method for assessing building performance, the method comprising: receiving, at an integrated interface, a building performance model having a plurality of predicted building performance metrics, receiving, at an integrated interface, a plurality of trended building performance metrics, and generating a platform to facilitate the comparison of the predicted building performance metrics with the trended building performance metrics to identify performance gaps.

Supported embodiments include the foregoing computer-implemented method, further comprising: modifying the building performance model to produce an enhanced building performance model.

Supported embodiments include any of the foregoing computer-implemented methods, further comprising: receiving the predicted building performance metrics and the trended building performance metrics in essentially the same format to form an integrated data stream.

Supported embodiments include any of the foregoing computer-implemented methods, further comprising: enabling an interrogation based commissioning assistance module to utilize the integrated data stream.

Supported embodiments include any of the foregoing computer-implemented methods, further comprising: producing, through a dashboard, output for a dynamic decision matrix.

Supported embodiments include any of the foregoing computer-implemented methods, further comprising: providing, through a dashboard, a dynamic display.

Supported embodiments include any of the foregoing computer-implemented methods, further comprising: providing, through a dashboard, output for visually assessing a plurality of key performance indicators for a building.

Supported embodiments include any of the foregoing computer-implemented methods, further comprising: providing, through a dashboard, output to enable impact assessments for owners for sustainability goals, first costs and long term operating costs.

Supported embodiments include any of the foregoing computer-implemented methods, further comprising: providing, through the dashboard, output to enable visual identification of the relationship between trended building performance and predicted building performance.

Supported embodiments include any of the foregoing computer-implemented methods, wherein the building performance model is a design model, further comprising: receiving trended data to calibrate the design model and convert the design model into an operational model. Supported embodiments include any of the foregoing computer-implemented methods, further comprising: enabling interrogation-based commissioning.

Supported embodiments include any of the foregoing computer-implemented methods, further comprising: enhancing a project model.

Supported embodiments include any of the foregoing computer-implemented methods, further comprising: enabling on-site dynamic dashboard displays.

Supported embodiments include any of the foregoing computer-implemented methods, further comprising: improving actual building performance.

Supported embodiments include any of the foregoing computer-implemented methods, further comprising: improving predicted performance of the virtual buildings.

Supported embodiments include any of the foregoing computer-implemented methods, further comprising: enabling the virtual assessment of key performance indicators otherwise not available during various stages of the construction cycle.

Supported embodiments include any of the foregoing computer-implemented methods, further comprising: enabling impact assessments for owners relating to sustainability goals, first costs and long term operating costs.

Supported embodiments include any of the foregoing computer-implemented methods, further comprising: enabling visual identification of the relationship between trended and predicted building performance otherwise not available during early operations of a building.

Supported embodiments include any of the foregoing computer-implemented methods, further comprising: dynamically assessing the relationships between building performance goals, building construction costs, and long-term operational costs throughout the entire building construction cycle.

Supported embodiments include any of the foregoing computer-implemented methods, further comprising: transmitting physical trended data and virtual predicted data in similar formats to enable the integration of data streams.

Supported embodiments include any of the foregoing computer-implemented methods, further comprising: enabling the determination of gaps between trended versus predicted building performance data.

Supported embodiments include any of the foregoing computer-implemented methods, further comprising: enabling the identification of gaps between predicted data and trended data to inform a dynamic decision matrix.

Supported embodiments include any of the foregoing computer-implemented methods, further comprising: enabling the utilization of a dynamic decision matrix to enable impact assessments for owners relating to building performance goals, building construction costs, and long-term operational costs.

Supported embodiments include a system, an apparatus, a computer-readable storage medium, and/or means for implementing and/or performing any of the foregoing computer-implemented methods or portions thereof.

Supported embodiments include a system for assessing building performance, the system comprising: a virtual data acquisition component for generating a building performance model having a plurality of predicted building performance metrics, a physical data acquisition component for obtaining a plurality of trended building performance metrics, and an integrated interface for receiving the building performance model from the virtual data acquisition component having the plurality of predicted building performance metrics and the plurality of physical building performance metrics from the physical data acquisition component, wherein the integrated interface enables the comparison of the predicted building performance consumption metrics with the trended building performance metrics to identify performance gaps.

Supported embodiments include the foregoing system, wherein the integrated interface enables modification of the building performance model to produce an enhanced building performance model.

Supported embodiments include any of the foregoing systems, wherein the integrated interface enables an interrogation based commissioning assistance module to modify the enhanced building performance model, and wherein the integrated interface provides output for a dynamic decision matrix.

Supported embodiments include a computer-implemented method, a system, a computer-readable storage medium, and/or means for implementing and/or performing any of the foregoing apparatuses or portions thereof.

Supported embodiments include a computing system for providing a platform for calculating building performance metrics, the system comprising: a processor configured to execute computer-executable instructions; and memory storing computer-executable instructions configured to: access a memory device to obtain a building performance model for a building with the building performance model having a plurality of predicted building performance metrics for a plurality of time intervals over a predetermined period of time stored thereon with each predicted building performance metric corresponding one of the plurality of time intervals, generate a landing page having at least one building icon relating to the building, a consumption tab, and at least one link connecting the landing page to the consumption tab, receive at least one building sensor measurement for at least one time interval within the predetermined period of time, determine at least one actual building performance metric for the at least one time interval within the predetermined period of time, and display the at least one actual building performance metric with a corresponding predicted building performance metric on the consumption tab, so that the at least one actual building performance metric can be compared to the predicted building performance metric for the at least one time interval within the predetermined period of time.

Supported embodiments include foregoing computing system, further configured to: generate a sensor tab for displaying sensor output derived from the building sensor measurement.

Supported embodiments include any of the foregoing computing systems, wherein the sensor output includes data selected from the group consisting of real-time temperature data, humidity data, indoor air quality data, and other indoor environmental quality data. The data can be displayed as aggregated data or disaggregated data. The indoor environmental quality data can include information about carbon monoxide (CO), lead (Pb), nitrogen dioxide ($NO_2$), Ozone ($O_3$), particulate matter (PM10 and PM2-5) and sulfur dioxide ($SO_2$), carbon dioxide ($CO_2$), and radon.

Supported embodiments include any of the foregoing computing systems, further configured to: generate an energy use metrics tab for displaying energy use metrics output.

Supported embodiments include any of the foregoing computing systems, further comprising: an interface for communicating with a portfolio manager application over a network; wherein the portfolio manager application calculates at least one energy use metric and the interface receives the energy use metric from the portfolio manager application.

Supported embodiments include any of the foregoing computing systems, further configured to: generate energy use metric output from the energy use metric.

Supported embodiments include any of the foregoing computing systems, further configured to: display the landing page and the consumption tab on a display device selected from the group consisting of a building monitor display, desktop PC monitor, laptop monitor, a tablet, and a smartphone.

Supported embodiments include any of the foregoing computing systems, further configured to: generate an energy use metrics tab for displaying energy use metrics output.

Supported embodiments include any of the foregoing computing systems, further configured to: display the landing page, the consumption tab, the sensor tab, and the energy use metrics tab on a display device selected from the group consisting of a building monitor display, desktop PC monitor, laptop monitor, a tablet, and a smartphone.

Supported embodiments include a computer-implemented method, an apparatus, a computer-readable storage medium, and/or means for implementing and/or performing any of the foregoing systems or portions thereof.

Supported embodiments include a computing-implemented method for providing a platform for calculating building performance metrics, the method comprising: accessing a memory device to obtain a building performance model for a building with the building performance model having a plurality of predicted building performance metrics for a plurality of time intervals over a predetermined period of time stored thereon with each predicted building performance metric corresponding one of the plurality of time intervals, generating a landing page having at least one building icon relating to the building, a consumption tab, and at least one link connecting the landing page to the consumption tab, receiving at least one building sensor measurement for at least one time interval within the predetermined period of time, determining at least one actual building performance metric for the at least one time interval within the predetermined period of time, and enabling the display of the at least one actual building performance metric with a corresponding predicted building performance metric on the consumption tab, so that the at least one actual building performance metric can be compared to the predicted building performance metric for the at least one time interval within the predetermined period of time.

Supported embodiments include the foregoing method, further comprising: generating a sensor tab for displaying sensor output derived from the building sensor measurement.

Supported embodiments include any of the foregoing methods, further comprising: generating an energy use metrics tab for displaying energy use metrics output.

Supported embodiments include any of the foregoing methods, further comprising: communicating with a portfolio manager application over a network to obtain at least one energy use metric from the portfolio manager application; and deriving the energy use metrics output from the energy use metric.

Supported embodiments include a system, an apparatus, a computer-readable storage medium, and/or means for implementing and/or performing any of the foregoing computer-implemented methods or portions thereof.

Supported embodiments include an apparatus for monitoring building performance metrics, the apparatus comprising: a building model generating system for generating a building performance model having a plurality of predicted building performance metrics; a computing system connecting to the building model generating system over a network and hosting a building performance assessment platform thereon; and a building having at least one sensor for monitoring actual building performance metrics in real-time with the sensor connected to the computing system; wherein the building performance assessment platform receives the building performance model from the building model generating system and derives the actual building performance metrics from the sensor; wherein the building performance assessment platform enables the comparison of the predicted building performance metrics from the building performance model with the actual building performance metrics.

Supported embodiments include the foregoing apparatus, wherein the building performance assessment platform includes a landing page, a consumption tab, a sensor tab, and an energy use metrics tab.

Supported embodiments include any of the foregoing apparatuses, wherein the computing system is configured to display the landing page and the consumption tab on a display device selected from the group consisting of a building monitor display, desktop PC monitor, laptop monitor, a tablet, and a smartphone.

Supported embodiments include any of the foregoing apparatuses, wherein the computing system is configured to display the actual consumption metrics with the predicted building performance metric on the consumption tab.

Supported embodiments include any of the foregoing apparatuses, wherein the computing system is configured to display sensor output derived from the sensor on the sensor tab.

Supported embodiments include any of the foregoing apparatuses, wherein the sensor is a sensor selected from the group consisting of a temperature sensor, a humidity sensor, and an indoor environmental quality sensor.

Supported embodiments include any of the foregoing apparatuses, wherein the computing system includes an interface for communicating with a portfolio manager application over the network with the portfolio manager application calculating at least one energy use metric for display on the energy use metrics tab.

Supported embodiments include any of the foregoing apparatuses, further including a meter and a JACE with the sensor connecting to the meter and to the JACE to form a sensor assembly.

Supported embodiments include a computer-implemented method, a system, a computer-readable storage medium, and/or means for implementing and/or performing any of the foregoing apparatuses or portions thereof.

Supported embodiments include a computer-readable storage medium storing computer-executable instructions that, when executed by a computing device, cause the computing device to: access a memory device to obtain a building performance model for a building with the building performance model having a plurality of predicted building performance metrics for a plurality of time intervals over a predetermined period of time stored thereon with each predicted building performance metric corresponding one of the plurality of time intervals, generate a landing page having at least one building icon relating to the building, a consumption tab, and at least one link connecting the landing page to the consumption tab, receive at least one building sensor measurement for at least one time interval within the predetermined period of time, calculate at least one actual building performance metric for the at least one time interval within the predetermined period of time, and enable the display of the at least one actual building performance metric with a corresponding predicted building performance metric on the consumption tab, so that the at least one actual building performance metric can be compared to the predicted building performance metric for the at least one time interval within the predetermined period of time.

Supported embodiments include a kit for monitoring building performance metrics, the kit comprising: a building model generating system for generating a building performance model having a plurality of predicted building performance metrics; a computing system connecting to the building model generating system over a network and hosting a building performance assessment platform thereon; and at least one sensor assembly having a sensor for monitoring actual building performance metrics in real-time.

Supported embodiments can provide various attendant and/or technical advantages in terms of improved efficiency and/or savings with respect to power consumption, memory processor cycles, and/or other computationally-expensive resources. By way of illustration and not limitation, various features and implementations in accordance with the described subject matter offer many benefits, which include a building monitoring system that enables a dashboard that gives building owners the ability to "drill down" to the single building level with just a few clicks of the mouse.

Supported embodiments include a dashboard that provides updated metrics that provide insight into EUI, energy costs, and greenhouse gas emissions.

Supported embodiments include a system for monitoring building performance with scalability that provides support for a single building or portfolios of buildings.

Supported embodiments include a system for monitoring building performance that exhibits simplicity that allows "at-a-glance" delivery of key site and building metrics.

Supported embodiments include a dashboard that exhibits "ease of navigation" to provide answers with a fewer mouse clicks.

Supported embodiments include a system that displays of aggregated and disaggregated whole-building performance data. Aggregated data can include multiple sensors and multiple sources of data. Disaggregated data can include fewer sensors or a single sensor. Disaggregated data can include fewer sources of data or a single source of data. Time intervals can be on a year to year scale for aggregated data and on as little as a fifteen minute scale for disaggregated data.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies.

As such, various operations illustrated and/or described can be performed in the sequence illustrated and/or described, in other sequences, in parallel, or omitted. For example, it should be understood that an embodiment is contemplated in which a building monitoring system calculates or determines various building performance metrics by obtaining those metrics from an energy computation server. Another exemplary embodiment is contemplated in which a building model generating system resides on the same computer, computing device, and/or computer system as a building monitoring system.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A system for assessing building performance of a building, the system comprising:
   a virtual data acquisition component for holding a building energy model having a plurality of predicted building performance metrics for the building with the building energy model being a design model,
   a physical data acquisition component for obtaining a plurality of trended building performance metrics for the building to transform the building energy model from a design model into an operational model, and
   an integrated interface for receiving the building energy model having the plurality of predicted building performance metrics from the virtual data acquisition component and the plurality of physical building performance metrics from the physical data acquisition component,
   wherein the integrated interface forms an integrated data stream having performance gaps that can be identified through a comparison of actual building performance to simulated targets with the simulated targets representing at least one of building design simulated targets and building planning simulated targets,
   wherein the integrated interface implements a building performance assessment platform to produce output based upon the building energy model and the performance gaps,
   wherein the building performance assessment platform communicates the output to an output device, and
   wherein the integrated interface receives input, through an input device, relating to the building energy model and sends data relating to the physical performance of the building to the building energy model in response to the input.

2. The system of claim 1, wherein the integrated interface receives manually-entered data for the building energy model.

3. The system of claim 1, wherein the building performance assessment platform implements a dynamic decision matrix output production module to provide output for a dynamic decision matrix on the output device.

4. The system of claim 1, wherein the dynamic decision matrix includes building performance goals, building construction costs, and long-term operational costs for a building.

5. The system of claim 1, wherein the integrated interface forms an integrated data stream with the predicted building performance metrics and the trended building performance metrics.

6. The system of claim 1, wherein the building performance assessment platform implements an interrogation-based commissioning module to identify performance corrections.

7. The system of claim 1, wherein the physical data acquisition component is selected from the group consisting of a physical data input device and a data transmission device.

8. The system of claim 1, wherein the integrated interface produces output that displays the plurality of predicted building performance metrics and the plurality of physical building performance metrics as a function of time to illustrate the performance gaps.

9. A system for assessing building performance of a building, the system comprising:
   a virtual data acquisition device,
   a physical data acquisition device,
   an integrated interface,
   a client device, and
   a network connecting the virtual data acquisition device to the physical data acquisition device, the integrated interface, and the client device,
   wherein the virtual data acquisition device holds a building energy model having a plurality of predicted building performance metrics for the building with the building energy model being a design model,
   wherein the physical data acquisition device obtains a plurality of trended building performance metrics for the building to transform the building energy model from a design model into an operational model,
   wherein the integrated interface receives the building energy model having the plurality of predicted building performance metrics from the virtual data acquisition device and the plurality of physical building performance metrics from the physical data acquisition device to form an integrated data stream for the identification of performance gaps that can be identified through a comparison of actual building performance to simulated targets with the simulated targets representing at least one of building design simulated targets and building planning simulated targets,
   wherein the integrated interface communicates the integrated data stream to the client device, so that the client device can display output based upon the building energy model and the performance gaps, and
   wherein the client device receives input and communicates the input to the integrated interface, so that the integrated interface can send data relating to the physical performance of the building to the building energy model in response to the input.

10. The system of claim 9, wherein the virtual data acquisition device generates the building energy model.

11. The system of claim 9, wherein the integrated interface implements a dynamic decision matrix output production module to provide output for a dynamic decision matrix on the client device.

12. The system of claim 11, wherein the dynamic decision matrix includes building performance goals, building construction costs, and long-term operational costs for a building.

13. The system of claim 9, wherein the integrated interface forms an integrated data stream with the predicted building performance metrics and the trended building performance metrics.

14. The system of claim 9, wherein the integrated interface implements an interrogation-based commissioning module to identify performance corrections.

15. The system of claim 9, wherein the physical data acquisition device is selected from the group consisting of a physical data input device and a data transmission device.

16. A computing-implemented method for assessing building performance for a building, the method comprising:
   storing, with a virtual data acquisition device, a building energy model having a plurality of predicted building performance metrics for the building with the building energy model being a design model,
   obtaining, with a physical data acquisition device, a plurality of trended building performance metrics for the building to transform the building energy model from a design model into an operational model,
   receiving, with an integrated interface, the building energy model having the plurality of predicted building performance metrics from the virtual data acquisition device and the plurality of physical building performance metrics from the physical data acquisition device,
   forming an integrated data stream for comparing the predicted building performance metrics with the trended building performance metrics to identify performance gaps that can be identified through a comparison of actual building performance to simulated targets with the simulated targets representing at least one of building design simulated targets and building planning simulated targets,
   displaying output based upon the building energy model and the performance gaps, and
   sending data relating to the physical performance of the building to the building energy model in response to the input.

* * * * *